United States Patent [19]

Schloss

[11] Patent Number: 5,706,507

[45] Date of Patent: Jan. 6, 1998

[54] SYSTEM AND METHOD FOR CONTROLLING ACCESS TO DATA LOCATED ON A CONTENT SERVER

[75] Inventor: Robert Jeffrey Schloss, Briarcliff Manor, N.Y.

[73] Assignee: International Business Machines Corporation, Armonk, N.Y.

[21] Appl. No.: 503,658

[22] Filed: Jul. 5, 1995

[51] Int. Cl.$^6$ ................................................. C06F 17/30
[52] U.S. Cl. ........................... 395/615; 395/604; 395/609; 395/610; 395/333; 395/326; 395/327
[58] Field of Search ................................. 395/600, 200.09, 395/604, 609, 615, 610, 333, 326, 327; 364/514

[56] References Cited

U.S. PATENT DOCUMENTS

| | | | |
|---|---|---|---|
| 5,347,623 | 9/1994 | Takano et al. | 395/157 |
| 5,394,526 | 2/1995 | Crouse et al. | 395/200 |
| 5,408,600 | 4/1995 | Garfinkel et al. | 395/153 |
| 5,410,691 | 4/1995 | Taylor | 395/600 |
| 5,493,677 | 2/1996 | Balogh et al. | 395/600 |
| 5,499,046 | 3/1996 | Schiller et al. | 348/6 |
| 5,544,320 | 8/1996 | Konrad | 395/200.09 |
| 5,553,221 | 9/1996 | Reimer et al. | 395/154 |
| 5,557,541 | 9/1996 | Schulof et al. | 364/514 |
| 5,559,933 | 9/1996 | Boswell | 395/114 |
| 5,596,705 | 1/1997 | Reimer et al. | 395/326 |
| 5,597,307 | 1/1997 | Redford et al. | 434/118 |

OTHER PUBLICATIONS

Katia Obraczka et al., "Internet Resource Discovery Services", University of Southern California, No. 9, pp. 8–22, Sep. 26, 1993.

Michael Caplinger, "An Information System Based on Distributed Objects", Object–Oriented Programming Systems, Languages and Applications, vol. 22, No. 12, Dec. 1987.

Hokimoto et al., "An Approach for Constructing Mobile Applications Using Service Proxies", IEEE, pp. 726–733, 1996.

Teresa Lau, "Building a Hypermedia Information System on the Internet", IEEE, pp. 192–197, 1994.

Eric Bina et al., "Secure Access to Data Ofver the Internet", IEEE, pp. 99–102, Mar. 1994.

Vetter et al., "Mosaic and the World–Wide Web", IEEE, pp. 49–57, May 1994.

Uffe Kock Wiil, "Issues in the Design of EHTS: A Multiuser Hypertext System for Collaboration", IEEE, pp. 629–639, Jul. 1992.

"Sample Screenshots from ComMentor" http://www–diglib/stanford.edu/rms/tr/shots, no date.

"Surfwatch" Current Press Releases http://www/surfwatch-.com/ May 15, 1995.

Intenet–Draft Internet Engineering Task Force KidCode Jun. 1995.

"Beyond Browsing: Shared Comments, Soaps, Trails, and On–line Communities", M. Roscheisen et al., Computer Networks ISDN Systems (Netherlands), vol. 27, No. 6, pp. 739–749, Apr. 1995.

*Primary Examiner*—Thomas G. Black
*Assistant Examiner*—Cheryl Lewis
*Attorney, Agent, or Firm*—Whitham, Curtis, Whitham & McGinn; Kevin M. Jordan, Esq.

[57] ABSTRACT

The content of free speech over distributed networks, such as the Internet, is often inappropriate for minors as well as offensive to some adults. The invention comprises an advisory server operated by, for example, a third party watchdog group, which rates the content of data downloaded from a content server to a client in order to block or censor unwanted material. In operation, each time data (e.g., a web page) is downloaded from a content server to the client, prior to display, the client sends a request signal to the advisory server asking that it advise the client on the content of the web page. The advisory server rates the page and sends a classification rating back to the client. The client thereafter displays or does not display the web page according to the classification rating based on the client's selected preferences. The advisory server may also assign a rating to any links contained on the web page or may also be asked by the client to block any pages which require a fee. In this manner parents are effectively empowered control the content of data disseminated in their homes.

36 Claims, 20 Drawing Sheets

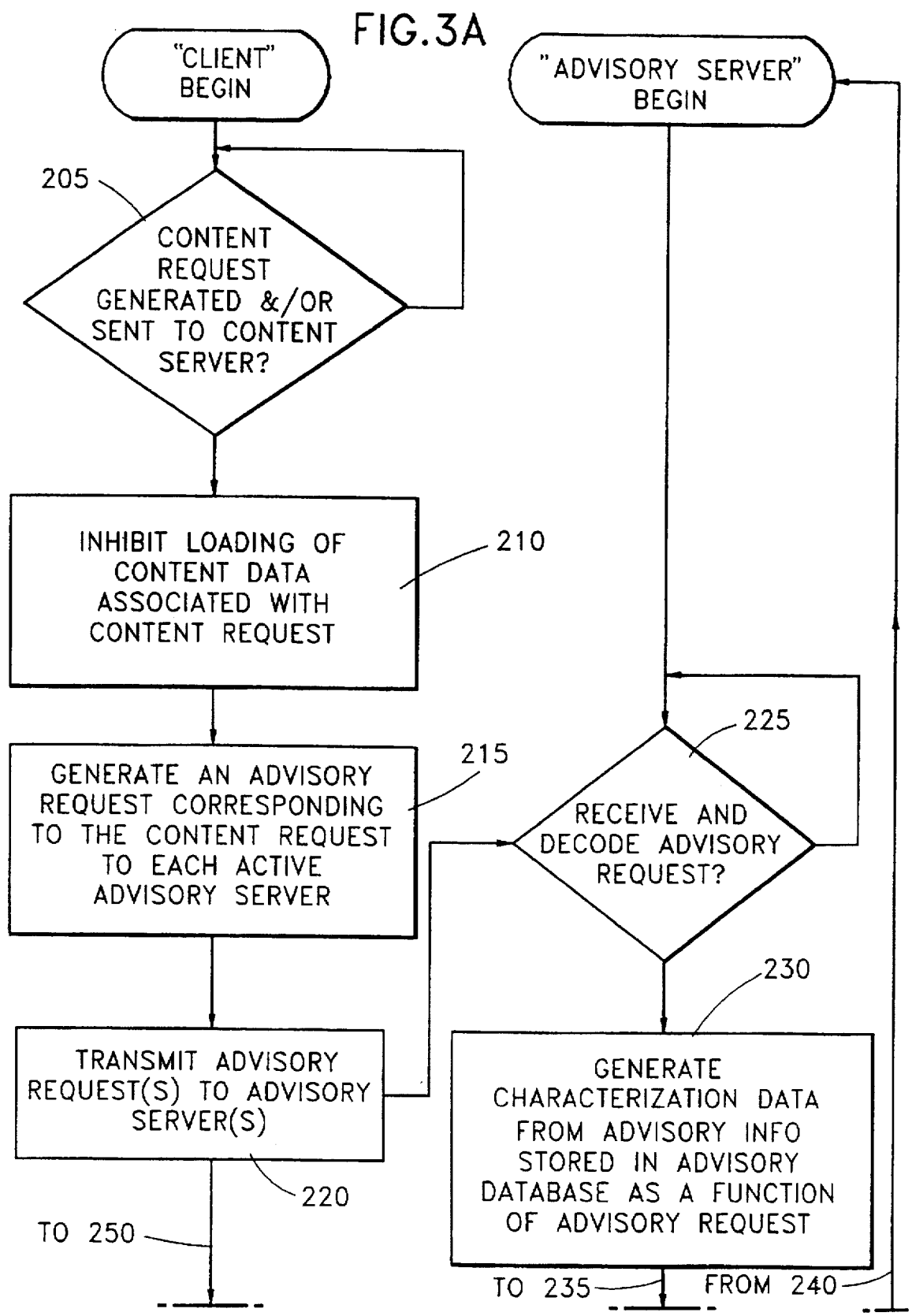

FIG.13A — OVERUSE DETECTION TABLE (1301)

| USER ID | TIME OF DAY OF LAST n00 REQUESTS FROM THIS USER | | |
|---|---|---|---|
| JONES | 12:14:01:00, 12:14:01:01, 12:14:01:02,...12:16:43:07, 12:16:43:08 | | |
| BUTRICO | 12:11:00:38 | | |
| | | | |

FIG.13B — BLOCKING TABLE (1303)

| USER ID | DATE/TIME OF DAY BLOCKED | DATE/TIME TOLD OF BLOCKED | |
|---|---|---|---|
| RAVIN | 1995/06/13 11:22:31 | 1995/06/13 11:22:32 | |
| PRAGER | 1995/06/13 12:01:00 | | |
| | | | |

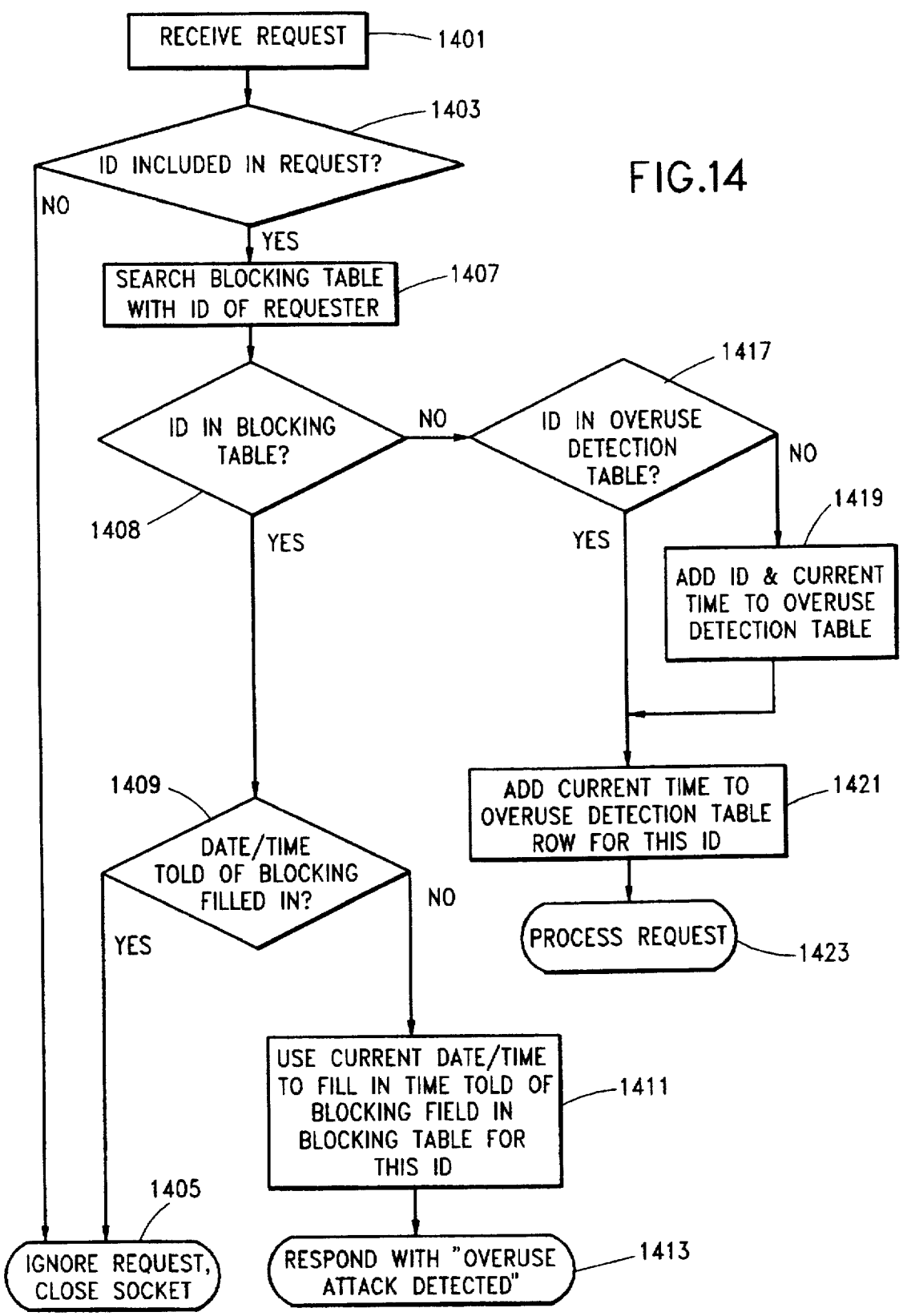

SYSTEM AND METHOD FOR CONTROLLING ACCESS TO DATA LOCATED ON A CONTENT SERVER

FIELD OF THE INVENTION

The present invention is related to distributed data communication system, and more particularly, to controlling access, or providing meta-information about, data located on content servers in distributed data communication systems.

BACKGROUND OF THE INVENTION

Electronic online information services that contain documents (as opposed to structured databases and transaction systems) emerged in the 1960s. These first generation services held all content on one server (such as DIALOG). Therefore, users normally understood the characteristics of the documents based on which service they used. Distributed online information services began with networked bulletin board systems such as UUCP, USENET, FIDOnet. However, these services were used by a tiny section of the population and did not contain data that was used to make important personal or business decisions. A third generation of online information emerged at the end of the 1980s as the Internet became common on college campuses, businesses and government agencies. The World Wide Web was developed under the leadership of Tim Berners-Lee of CERN, as a method of fetching information from any cooperating computer on the Internet by simply clicking on a reference to that information. With the release of the first high-function Web browser program, Mosaic, by the National Center for Supercomputer Applications in early 1994, millions of users began to have access to millions of documents through the World Wide Web. These documents contain text, graphics, audio, video, etc.

The World Wide Web contains information that is updated regularly, and therefore is in many ways superior to consulting books or CD-ROMs. However, users may have trouble contextualizing the retrieved information: was it accurate when posted (made available), is it still accurate now, etc. The challenge of editorial assessment of a huge body of constantly changing and growing information, with no central depository site, forces users to depend upon independent assessments of the retrieved data. Users are familiar with doing this in other domains, such as "the Good Housekeeping Seal of Approval" for household goods.

It was recognized by the W3 Consortium and other voluntary standards groups for the World Wide Web that some automated mechanism of delivering assessments to users was needed. The urgent need for these items, ironically, is not being driven by business or other decision making based on Web information, but by a need to have filtering of adult-only material from young people who access the Web. Because it is easy to click from one document to another (which the one document points to) to another in seconds, this "traveling browsing" has become known as surfing the Web. In surfing the Web, children may have easy access to inappropriate videos, graphical data and other related information.

To address this issue, several mechanisms have been proposed and/or implemented. For example, the application WATCHDOG by Surfwatch allows a supervisor (i.e. a parent) to block particular content from being retrieved when browsing the World Wide Web. On a subscription basis, users periodically receive disks that contain a data base of blocked sites. The user then executes a utility program that updates the existing data base of blocked sites with the updated data base of blocked sites in the disks. When the user browses on the Web, the application cross-references the data base and selectively blocks the the loading of data from blocked sites identified in the data base.

Web Track from Webster Network strategies will block access to particular primary content sites, in 15 specific categories. Like Surfwatch, Webtrack stores a list of blocked sites in a data base, and when the user browse the Web, the application cross-references the data base and selectively blocks the loading of data from block sites identified in the data base. However, in this case, the data base is not created and updated on a subscription basis, but may be created and updated by the supervisor.

KidsCode is an Internet Draft proposal which uses a naming convention to indicating ratings, and requires voluntary compliance by primary publisher of the content data.

It is therefore an object of the present invention to provide a system and method to characterize content loaded (or available to be loaded) by a client from a content server via a protocol between the client and any number of independent non-co-located or combined advisory servers that maintain "ratings" knowledge bases, and to control filtering of the content data data according to the characterization.

Another object of the present invention is to provide a method and system wherein an advisory server indicates if the user will incur charges for accessing one or both of the content server and the advisory server.

Another object of the present invention is to provide one or more user profiles stored in a memory associated with the client that are utilized by the client to control the filtering of the requested content data and to generate information related to the requested content data.

Additional objects and advantages of the present invention will be set forth in the description which follows, and in part will be obvious from the description, or may be learned by practicing the invention.

SUMMARY OF THE INVENTION

To achieve the objects in accordance with the purposes of the present invention, as embodied and described herein, a distributed data communication system comprises a content requestor and a content server. Communication between the content requestor and the content server occurs over a first communication link. The content requestor under control of user input communicates a data request signal to the content server over the first communication link. The content server, upon receiving the data request signal, communicates content data to the content requestor according to the data request signal. The content data is filtered by:

setting the content requestor in an advisory mode wherein the content requestor communicates portions of said data request signal to an advisory server over a second communication link different from the first communication link, and wherein the first advisory server is remote from said first content server;

upon receipt of the portions of said data request signal, controlling the advisory server to retrieve characterization data from a data base coupled to the first advisory server, wherein the characterization data is linked to the portions of the data request signal, and to communicate the characterization data to said content requestor over the second communication link; and wherein the content requestor, in the advisory mode, inhibits loading of at least a portion of the content data according to the characterization data.

In addition, the content data may include a pointer identifying additional content data. In this case, the characterization generated by the advisory server may be related to the additional content data, and the content requestor, in the advisory mode, inhibits loading of at least a portion of the additional content data according to the characterization data.

BRIEF DESCRIPTION OF THE DRAWINGS

FIGS. 3(A) and 3(B) are flow charts illustrating operation of the advisory servers and clients running a Web Browser according to the present invention;

FIGS. 13(A)–(B) and 14 illustrate a data structure and operation of the advisory servers in detecting an overuse attack by a client according to the present invention.

DETAILED DESCRIPTION OF THE PRESENT INVENTION

Figure 1:
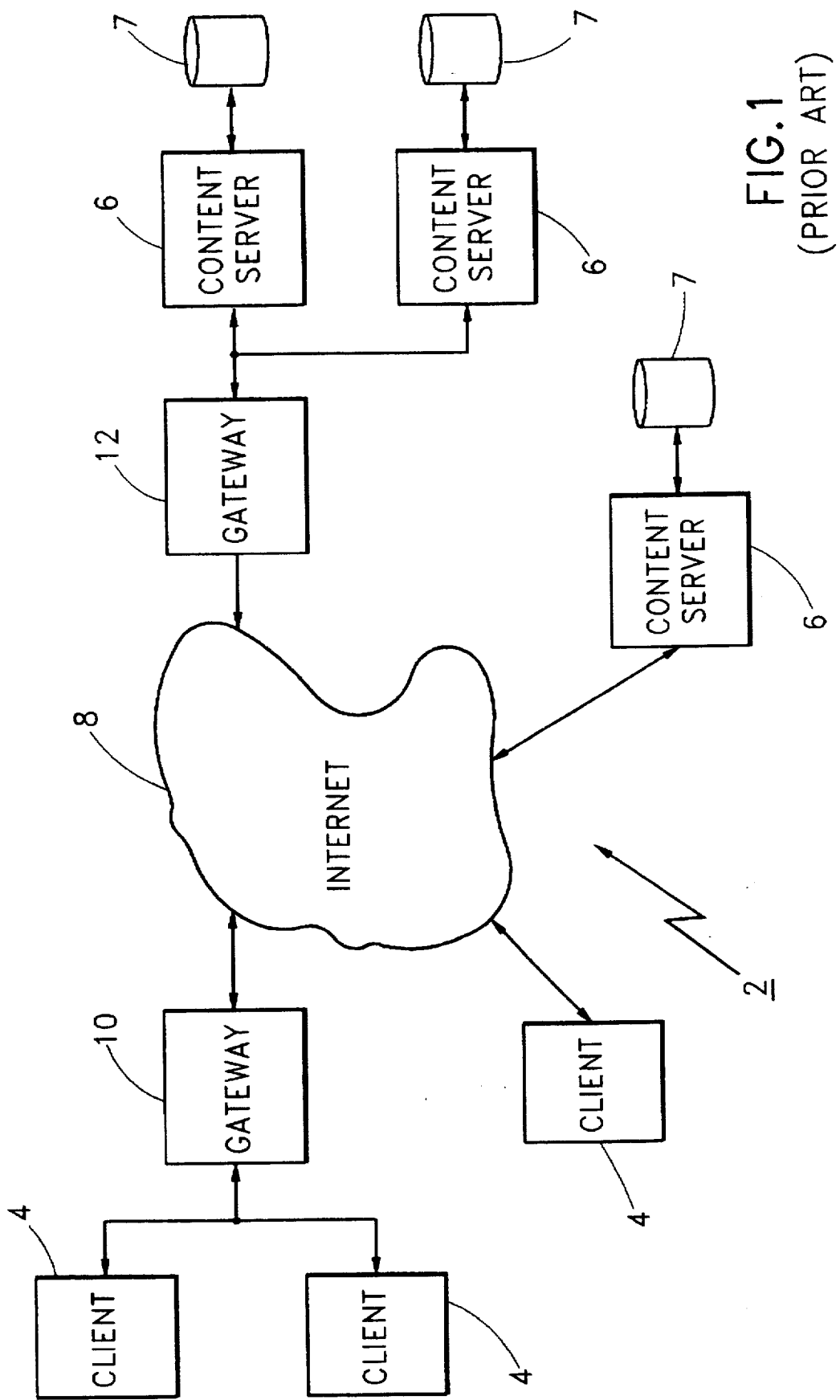
FIG. 1 is a pictorial representation of the Internet World Wide Web wherein a Client running a Web Browser request content data from a Content Server.

FIG. 1 is a pictorial representation of the Internet World Wide Web, commonly called the Web. The present invention as described below is embodied in the World Wide Web, but the invention is not limited in this respect, and may be embodied in any data communication system wherein a content requesting system request data from a content server, including but not limited to on-line information services, telephone networks, and television networks.

As shown in FIG. 1, the Web 2 includes a plurality of clients 4 (three shown) that interface to a plurality of content servers 6 (three shown) over the Internet 8. The content servers retrieve and/or generate content data from information stored in a data base 7 associated with the content server 6. Typically, the data base resides on a hard disk associated with the content server. A gateway 10 may be utilized to interface more than one client 4 to the Internet 8 as shown. Typically, the gateway 10 functions as a proxy server to cache the most recently requested content data, to control access to the Interact 8 to only specified clients 4, and for billing the clients 4 for access to the Internet 8. In addition, a gateway 12 may be utilized to interface more than one content server 6 to the Internet 8 as shown. In this case, the gateway 12 typically functions as a firewall to control access to the content servers to authorized users, and for centralized billing of access to the content servers, if appropriate. Note that one or more clients 4 may be linked to one or more content servers over a local area network. In this case, the functions or the gateway 10 and 12 may be integrated into a single gateway that interfaces to the local area network.

Users utilize a client system running a Web Browser, such as those sold under the trademarks NETSCAPE NAVIGATOR, IBM WEB EXPLORER and NSCA MOSAIC, to load content located on the content servers 6. The content may be in one of several standardized formats, with hyperlink anchors in one "page" of content pointing to other content that may be on the same server or on another remote server.

More specifically, a client system running a Web Browser request content from a content server 6 using a Hypertext Transfer Protocol (HTTP) request and receiving the content in a HTTP response. HTTP requests and responses occur over TCP/IP sockets that are communicated over the communication link between the client 4 and the content server 6. Much World Wide Web content consists of readable pages encoded using the Hypertext Markup language (HTML,). Thus, the word "page" and the word "content" are used interchangeably below. The user may generate the content request by explicitly asking for content stored on the content server 6 or by clicking on a hyperlink anchor 132 which points to content stored on content server 6. Upon receipt, the browser loads that content using an HTTP session. A more detailed description of HHTP may be found in Berners-Lee et al., "Hypertext Transfer Protocol—HTTP/1.0", draft-ieft-http-v10-spec-0.0 txt, 1995 Mar. 8 (Internet Draft), herein incorporated by reference in its entirety. A more detailed description of HTML, may be found in Berners-Lee, T. "Hypertext Markup Language (HTML,)", draft ieft,iiir-html-01, Jun. 1993 (expired working draft), herein incorporated by reference in its entirety. And a more detailed description of TCP/IP sockets and communication on the Internet may be found in W. Richard Stevens, "TCP/IP Illustrated, Volume 1—The Protocols", Addison-Wesley, 1994, pp. 1–20, 229–262, herein incorporated by reference in its entirety.

Figure 2:
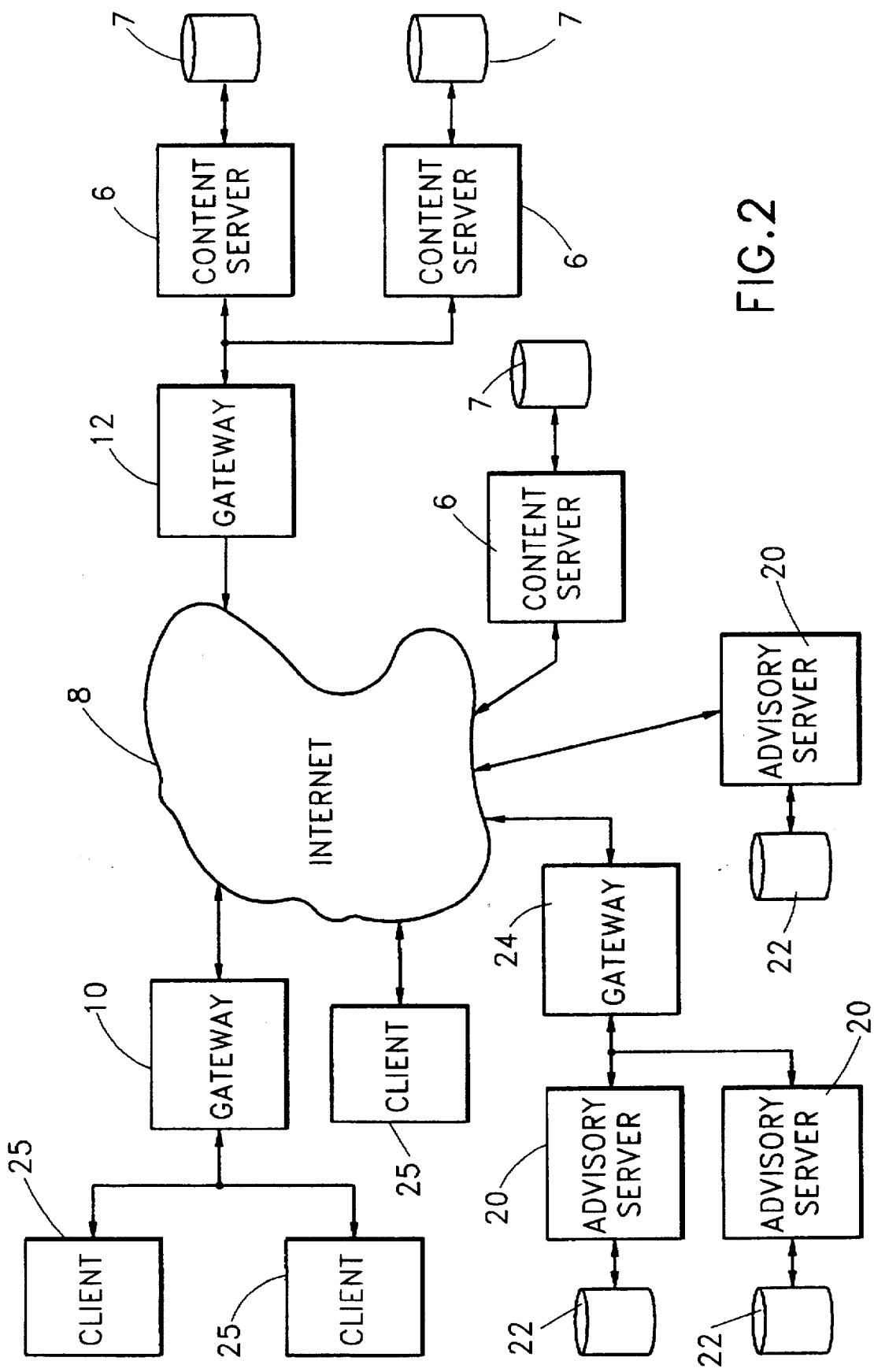
FIG. 2 is a pictorial representation of the World Wide Web including a client and one or more advisory servers according to the present invention.

According to the present invention, one or more advisory servers 20 (three shown) are interfaced to the Internet 8 as illustrated in FIG. 2. The advisory servers maintain one or more knowledge bases 22 that characterize the content generated by one or more of the content servers 6. In addition, the system includes one or more clients 25 (three shown) running a Web Browser that when set in an advisory mode, for each content request to the content servers 6, requests characterization data from one or more of the advisor servers 20. The advisory servers 20 generate the appropriate characterization data based upon the information stored in the knowledge base 22, and transmit the characterization data to the client 25. Upon receiving the characterization data, the client 25 utilizes the characterization data to determine whether to filter the content data transmitted by the content server 6. In addition, the client may utilize the characterization data to generate additional information. The advisory servers, when active, are preferably placed on an active list that identifies each active advisory server, for example by storing the URL of the advisory server 20. A more detailed description of URLs may be found in Berners-Lee et al., "Uniform Resource locators (URL)", RFC 1738, December 1994, herein incorporated by reference in its entirety.

Note that it is possible for the functions of the advisory server 20 to be integrated with the functions of the content server 6, but typically this will not be the case. Preferably, HTTP is used to communicate between the client 25 running the Web Browser and The advisory server 20. Note that more than one advisory server 20 may be interfaced to the Internet 8 by a gateway 24. The gateway 24 may function as a firewall to control access to the advisory server 20 to authorized users, and for centralized billing to access to the advisory servers, if appropriate.

FIGS. 3(A) and (B) illustrate in more detail the operation of the advisory servers 20 and the clients 25 running a Web Browser that includes an advisory mode according to the present invention. Specifically, at step 205 a client 25 generates and sends a content request to a content server 6 for information contained in knowledge base 7. In step 210, the client 25 may inhibit loading of content data associated with the content request at least until the characterization data is received from an active advisory server 20 and acted upon. In step 215, an advisory request for characterization data associated with the content request is generated to each active advisory server 20 concurrent with the aforementioned content request. As mentioned previously the characterization data may indicate that loading of the requested content data should be inhibited by the client 25. In step 220, the advisory request is generated to each active advisory server 20. In step 225, each active advisory server 20 receives and decodes the advisory request transmitted from the client 25. In step 230 each active advisory server 20 retrieves from its knowledge base 22 any stored characterization data associated with the advisory request. A more detailed description of the method and system utilized by the advisory server 20 to identify and store connections between tags identifying content (such as URLs) and associated meta-data (such as numeric rating codes or strings) may be found in Dockter et. al., U.S. patent application Ser. No. 08/267,022, entitled "Facility for the Storage and Management of Connections (Connection Server), filed Jun. 21, 1994, herein incorporated by reference in its entirety.

Figure 3B:
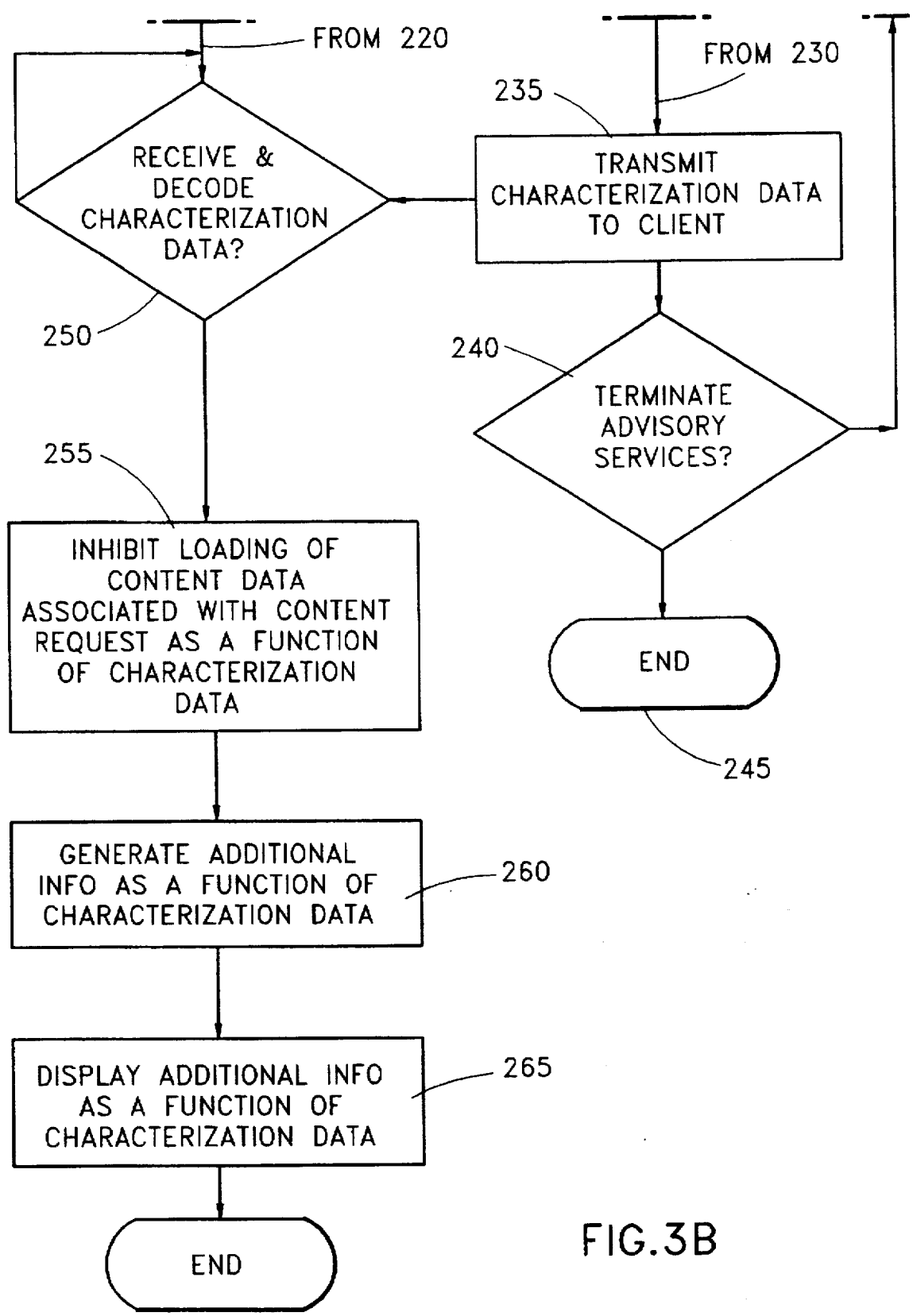

In step 235 the characterization data is transmitted to the requesting client 25. In step 240 a decision is made whether to deactivate this advisory server-client subscription (at step 245) or to continue to receive and decode advisory requests (at step 225). In step 250 the client 25 receives and decodes the characterization data transmitted from the advisory server 20 in step 235. Referring now to FIG. 3b, in step 255 the client may inhibit loading of or load the content data associated the contour request as a function of the received characterization data. For example, if the characterization data indicates the advisory server 20 has no relevant information related to the requested content data, the client 25 may load the content data associated with the content request; yet, if the character data returned from the advisory server indicates the data is offensive to minors, the client 25 may inhibit loading of the content data. In step 260, the client 25 may generate additional information related to the content request. The addition information may be an additional content request or any other meta-data related to, or contrasted with, the requested content data. In step 265, the client 25 may display the additional information to the user.

Figure 4:
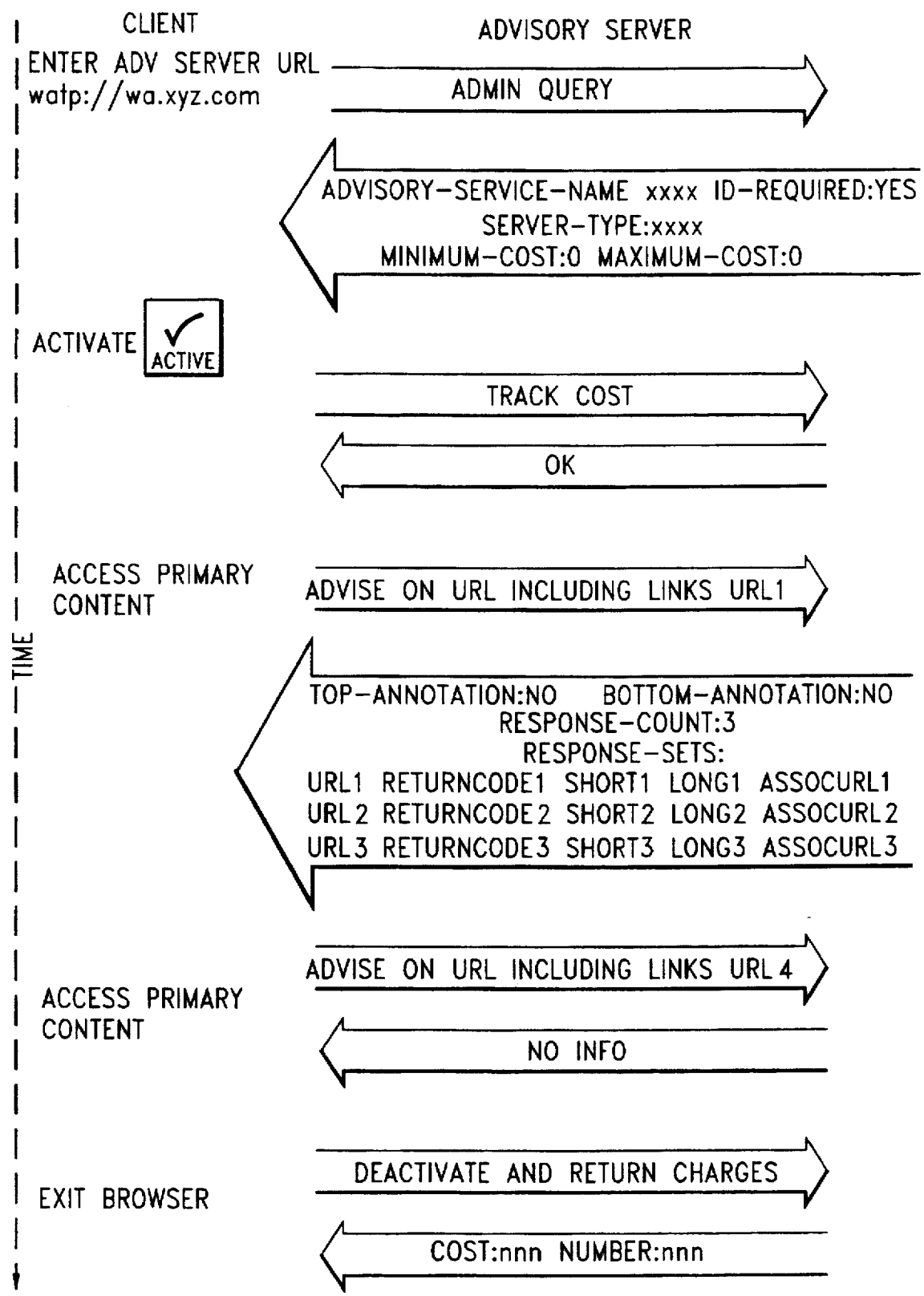
FIG. 4 illustrates all example of the data exchanged between the advisory server anti the client running a Web Browser according to the present invention.

FIG. 4 illustrates an example of the data exchanges between an advisory server 20 and the client 25 according to the present invention. The advisory request signal is identified "AdviseOnURLIncludingLinks" and the characterization data includes three response sets as shown.

Figure 5A:
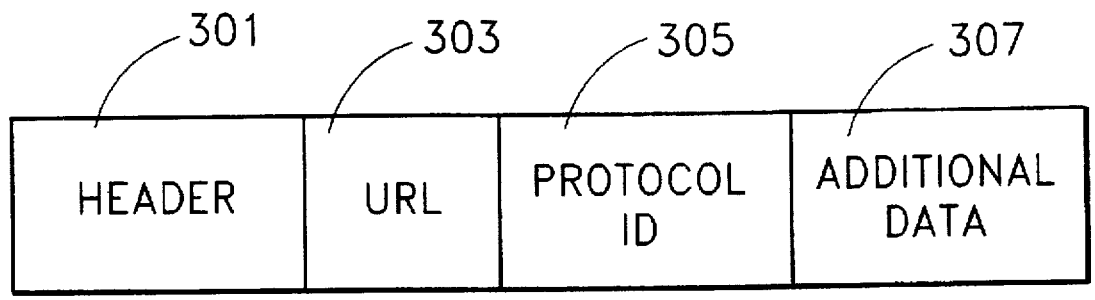
FIG. 5(A) illustrates a format of the advisory request signal transmitted from the client running the Web Browser to the advisory server according to the present invention.

FIG. 5(A) illustrates a format of the advisory request signal transmitted by the client 25 running a Web Browser to the advisory server 20 according to the present invention. As shown, the advisory request signal includes a header field 301 and a URL field 303. The header field 301 includes a command verb that identifies the type of request. For example, the command verb may be "AdviseOnURL" or "AdviseOnURLIncludingLinks". The command verb "AdviseOnURL" requests that the characterization data returned by the advisory server 20 pertain to only the particular page of content data requested from the content server 6. On the other hand, the command verb "AdviseOnURLIncludingLinks" requests that the characterization data returned by the advisory server 20 that pertains to the particular page of content data requested from the content server 6 plus any content linked to the particular page, for example, by a hypertext anchor within the page. In this case, the command verb indicates whether the request encoded within the advisory request signal is a "AdviseOnURL" request or an "AdviseOnURLIncludingLinks" request. The command verb may be represented by an encoded text string or an integer. The URL field 303 identifies the content data that has been requested from the content server 6. In the context of the Web, the URL field 303 is preferably the URL of the requested page.

As shown in FIG. 5(A), the advisory request signal may also include a protocol_ID field 305 and an additional data field 307. The protocol_ID field 305 identifies the particular version of the protocol embodied by the advisory request signal. The additional data field 307 may be used to communicate additional data.

Figure 5B:
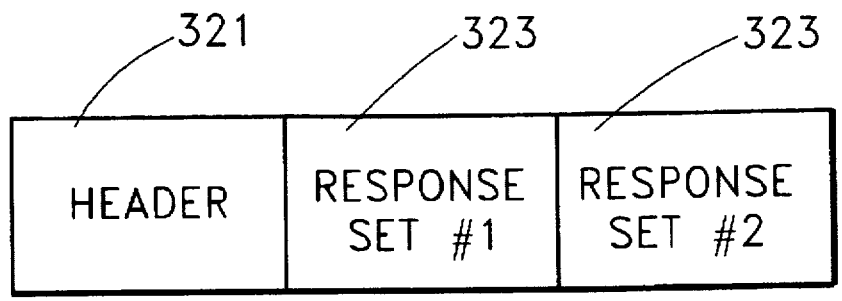
FIGS. 5(B) and (C) illustrate a format of the characterization data transmitted from the advisory server to the client running the Web Browser according the present invention.

FIG. 5(B) illustrates the format of the characterization data transmitted by the advisory server 20 to the client 25 running the Web Browser according to the present invention. As shown, the characterization data includes a header field 321. The header field 321 may include a protocol identifier that identifies the particular version of the protocol embodied by the characterization data and a return code that characterizes the content data identified by the URL field 303 of the advisory request signal. For example, the return code may indicate that the advisory server 20 does not have an information related to the content data identified by the URL field 303 of the advisory request signal. A more exhaustive list of possible return codes is found in Appendix A of the patent application.

The characterization data may also include one or more response sets 323 (two shown) that pertain to the content data identified by the URL field 303 of the advisory request signal. In this case, the header field 321 also includes data that identifies The number of response sets following. For example, FIG. 4 shows three response sets. The first is related to URL1, which is the particular page of content data identified by the URL field 303 of the advisory request signal. The second and third are related to URL2 and URL3, respectively, which are additional pages linked by hypertext anchors in the page identified by URL1.

Figure 5C:
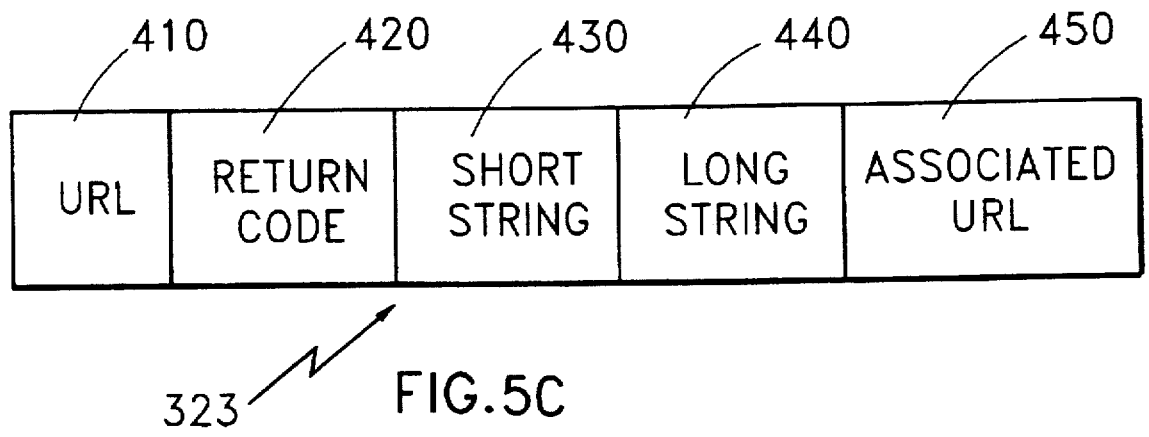

As shown in FIG. 5(C), each response set 323 may include a URL field 410, a return code 420, a short string field 430, a long string field 440, and an associated URL field 450. The URL field 410 identifies the content data associated with the response set. The return code 420 characterizes the content data identified by the URL field 450. For example, the return code may indicate that the URL contains sexually explicit material not suitable for minors. A more exhaustive list of the possible return codes is found in Appendix A of the patent application. The short string and long string fields 420 and 430 include text information that are related to The content data identified by the URL field 410. The associated URL field 450 identifies content data associated with the content data identified by the URL field 410. Upon receiving and decoding the response sets, the client 2 may display to the user the string information encoded within the string fields 430 and 440 and/or the associated content data identified by the associated URL field 450. A more detailed description of the operation of the client 25 in displaying the string information and/or associative content data is described below with respect to FIGS. 7 and 12(A)–(E). Moreover, depending upon the return code 420, the string fields 420 and 430 and associated URL field 450 may be omitted. For many return codes 420, the associated URL field 450 may or may not be sent.

Figure 6:
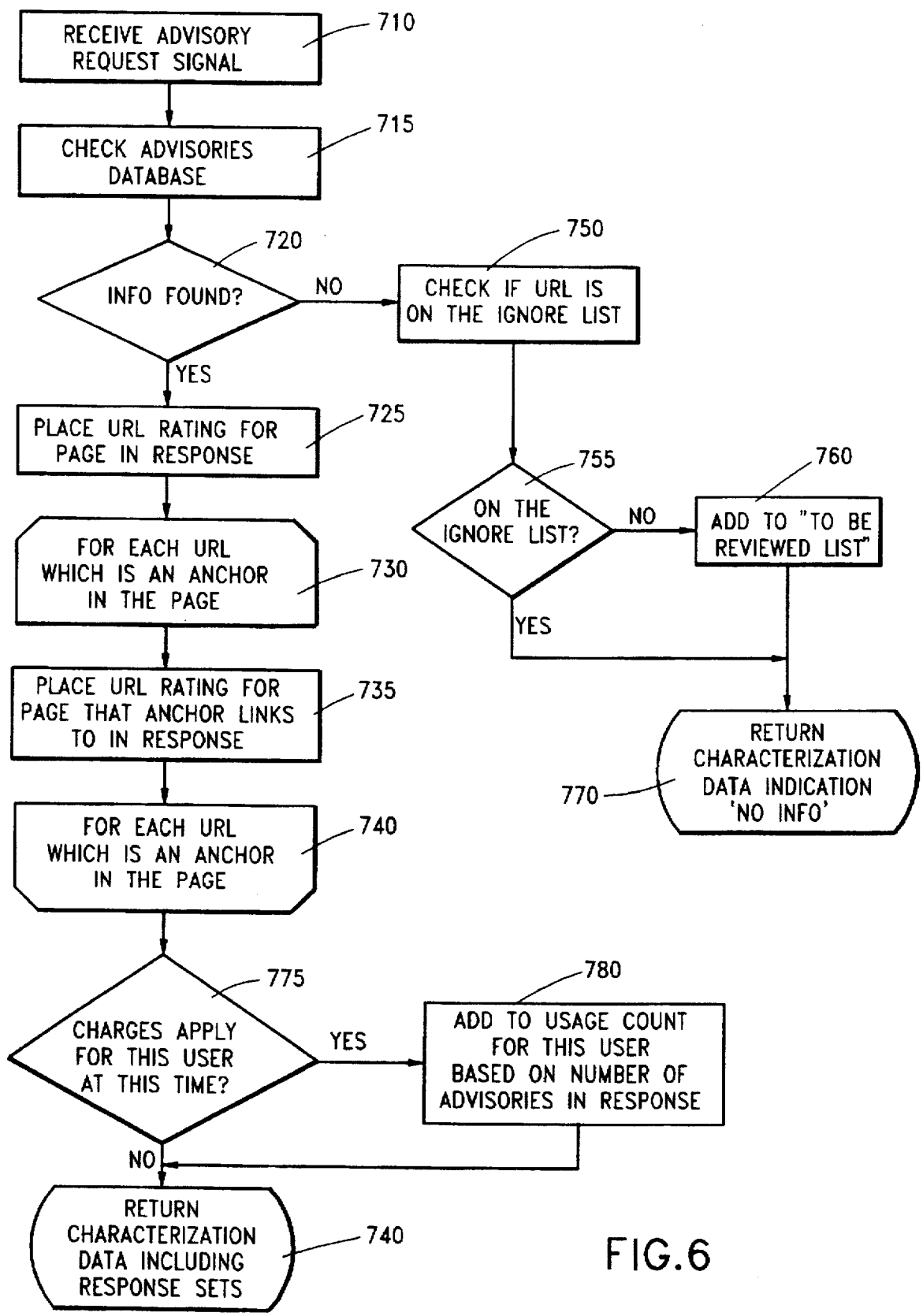
FIG. 6 is a flow chart that illustrates the operation of the advisory server in responding to an advisory request signal according to present invention.

FIG. 6 is a flow-chart that illustrates operation of the advisory server 25 in responding to an advisory request signal according to the present invention. For illustrative purposes only, FIG. 6 shows the operation of the advisory server 25 in responding to a particular advisory requested signal, the "AdviseOnURLIncludingLinks" signal, which requests that characterization data be returned that relates not only to the current page, but to those pages which have an anchor in the current page. In step 710, the advisory server 20 receives the advisory request signal transmitted by the client 25 running the Web Browser. In step 715, the advisory server 20 compares the URL field 303 of the AdviseOnURLIncludingLinks signal with the entries stored in the advisories knowledge base 22 to determine if one or more matching entries are present. An exact match to the URL field 303 may be required. In the alternative a fuzzy match may be utilized wherein if an exact match is not found, the entry having the longest matching prefix will be considered a match.

In step 720, if a match is not found, the operation of the advisory server 25 continues to step 750 to check if advisory requests related to the specific URL should be ignored. Step 750 may be accomplished by comparing the URL field 303 to entries stored in an Ignore list as shown in Table 11 of Appendix B. In step 755, if the URL field 303, or a prefix of the URL field 303, is not on the Ignore list, in step 760 the URL is added To Be Reviewed—URL list as shown in Table 14 of Appendix B, and operation continues to step 770). However, if the URL field 303, or a prefix of the URL field 303, is on the Ignore list in step 755, operation continues to step 770. In step 770, the advisory server 20 returns to the client 25 characterization data that indicates no information related to the URL is available. This may be accomplished by inserting a return code "000" into the header field 321 of the characterization data.

In step 720, when one or more matching entries exist in the knowledge base 22, the response set 323 corresponding to each matching entry is generated. More specifically, in step 725, the URL field 410, return code 420, short string 430, long string 440, and associated URL 450 corresponding to the URL field 303 are read from a URL Return code and phrase table, shown as Table 8 of Appendix B. In step 730, for each anchor included in the page identified by the URL field 303, the URL field 410, return code 420, short string 430, long string 440, and associated URL 450 corresponding to the anchor are read from the URL Return code and phrase table. The anchors included in the page may be read from a 'URL included in page' Table, shown as Table 10 in Appendix B. After all anchors have been processed in step 740, the advisory server 25, in step 775, may check whether the user should be charged for the advisory information and, if so, in step 780 records the the usage for billing purposes. Finally, in step 745, the characterization data including the response sets is returned to the client 25 in step 740.

Figure 7:
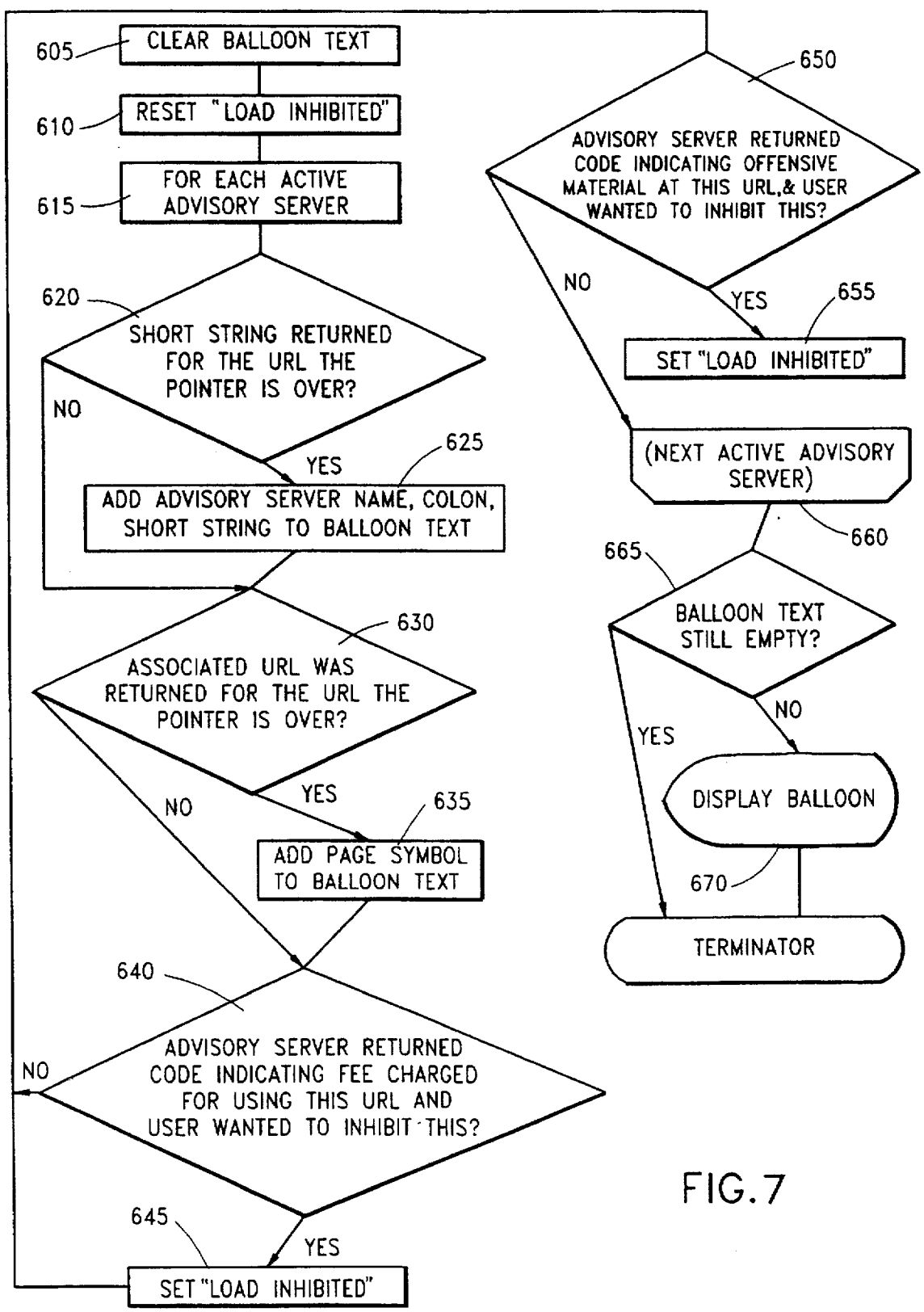
FIG. 7 is a flow chart illustrating operation of the client running a Web Browser when the user moves pointer over an anchor in the current page.

FIG. 7 is a flow chart illustrating operation of the client 25 running the Web Browser of the present invention when a user moves a pointer, such as a mouse arrow, over an anchor in a page. The client 25 must determine whether to display balloon help that includes the text information encoded within the short string field 430 of one or more response sets, and whether to block the activation of an anchor within the current page. This figure handles the case where the characterization data has been returned from each active advisory server 20, and where the user has not specified a preference for graphics over phrases. A balloon text variable is emptied in step 605. A flag controlling inhibition of anchor selection is reset to "no inhibit" in step 610. A loop is performed in steps 615 to 660 with a pass for each active advisory server. In step 620, if a short string field 430 was returned for the URL field 410 that matches the URL of an anchor, then the Advisory Server name followed by a colon, The short string, and a line-end is added to the working balloon text in step 625, and operation continues to step 630. For example, the balloon text may appear as "Family Values: X-Rated". If, in step 620 a short string field 430 was not returned for the URL field 410 that matches the URL of an anchor, then operation continues to step 630. In step 630, if an associated URL 450 was returned for the URL field 410, a page symbol icon is displayed in step 635, and operation continues to step 640. If, in step 630, an associated URL 650 was not returned for the URL field 410, operation continues to step 640. In step 640, if the return code indicated that the anchor leads to information that is charged for upon load, and the user specified that this was to be blocked, the "load inhibited" flag is set in step 645, otherwise operation continues to step 650. In step 650, if the return code indicated that the anchor leads to information that is offensive, and the user specified that this was to be blocked, the "load inhibited" flag is set in step 655, otherwise operation continues to step 615 for the next active advisory server until all active advisory servers have been processed in which operation continues to step 665. The load inhibited flag is checked if the user clicks on an anchor. In step 665, after all active server responses have been analyzed, if any items were put in balloon text (by steps 625, 635 or 665), the balloon 505 and the text 508 are displayed in step 670.

Figure 8A:
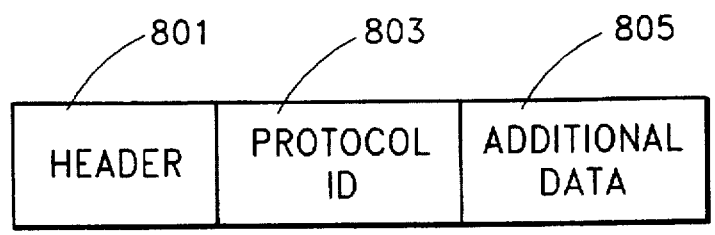
FIGS. 8(A) and (B) illustrate a format of an Administration Query signal and associated response communicated between the client running a Web Browser and the advisory server according to the present invention.

In another aspect of the present invention, when the user first activates a particular advisory server, an Administrative Query message may be sent from the client 25 running the Web Browser to the advisory server 20, preferably using a TCP/IP socket connection. The Administrative Query (AdminQuery) message seeks information pertaining to the status of the particular advisory server, for example, whether the advisory server is free, charges for advisories, pays the user for advisories, and what protocol version the server responds to. As shown in FIG. 8(A), the AdminQuery message preferably includes a header field 801, a protocol identification field 803, and additional data 805 if needed. The header field 801 includes a command verb that identifies the message as an AdminQuery message. The protocol identification field 803 identifies the protocol embedded in the message.

Figure 8B:
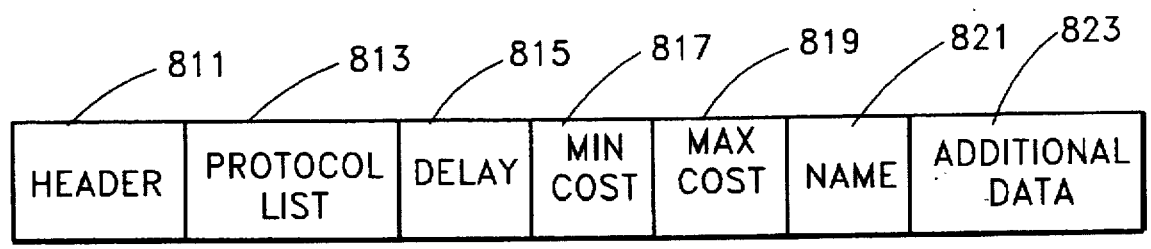

Upon receiving the AdminQuery message, the advisory server 20 generates a response and transmits the response to the client 25. As shown in FIG. 8(B), the response preferably includes a header 811, a protocol list field 813, a delay field 815, a min_cost field 817, a max_cost field 819, a name field 821, and additional data 823 if needed. The header 811 include data that identifies the protocol embedded in the response. The protocol list field 813 lists the protocols supported by the advisory server 20. The delay field 815 identifies the maximum delay likely based on advisory server load in 10ths of a second. The min_cost and max_cost fields 817 and 819 are pricing information that identify the minimum and maximum charge per advisory. If both are 0, the advisory service is free. This pricing information may be displayed to the user when the response to the AdminQuery message is received by the client 25. The name field 821 is text information identifying the name of the advisory server 25.

Figure 9A:
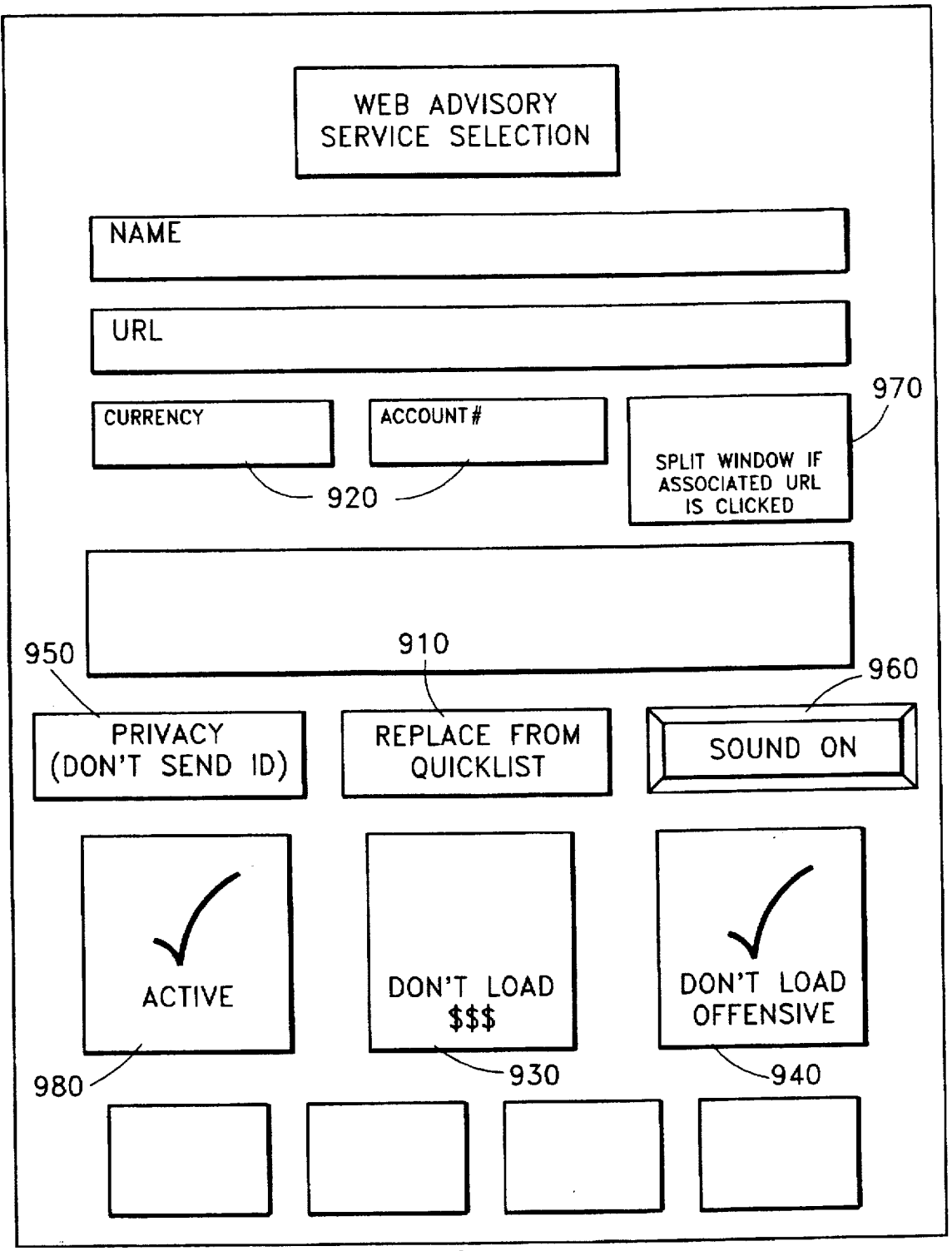
FIGS. 9(A) and (B) illustrate a dialog box in accordance with the present invention wherein a user specifics and/or activates a particular advisory server; server.
Figure 9B:
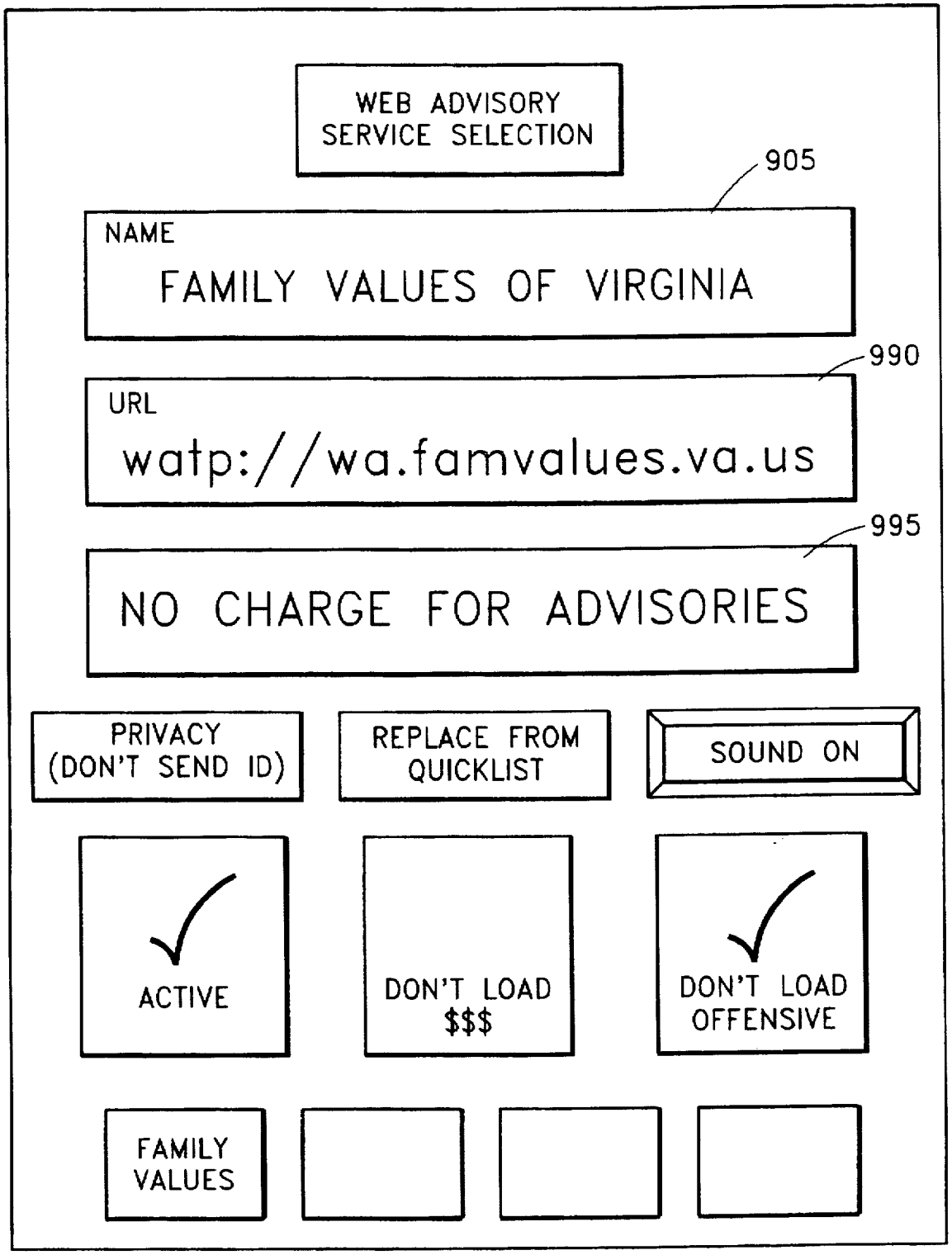

FIGS. 9(A) and 9(B) illustrate a dialog box in accordance with the present invention wherein a user specifies and/or activates a particular advisor server 25 by direct entry or by selection from a Quicklist 910. The user has the opportunity to indicate how they will pay if the server charges for advisories 920, as well as an opportunity to indicate if loading of content that costs money 930 or that is offensive 940 should be prevented. There are also other controls, such as: whether the user's ID should be sent 950 (an option for some free advisory servers); whether tones should be used when advisories are received 960; and whether clicking on the associated URL icon causes a split screen 970. Importantly, the user may activate/deactivate the particular advisor server by clicking on activate box 980. When activated, the advisory service protocol described above with respect to FIGS. 1–8 is triggered for the particular advisory server. FIG. 9(B) shows a specific example of the dialog box shown in FIG.9(A) with a specific advisory server name 985 and URL 990 filled in, and text information 995 related to pricing displayed. The text information 995 may be part of the response data transmitted by the advisory server 20, or may be generated by the client 25 according to the min_cost and max_cost fields 817 and 819 of the response to the AdminQuery message.

Figure 10:
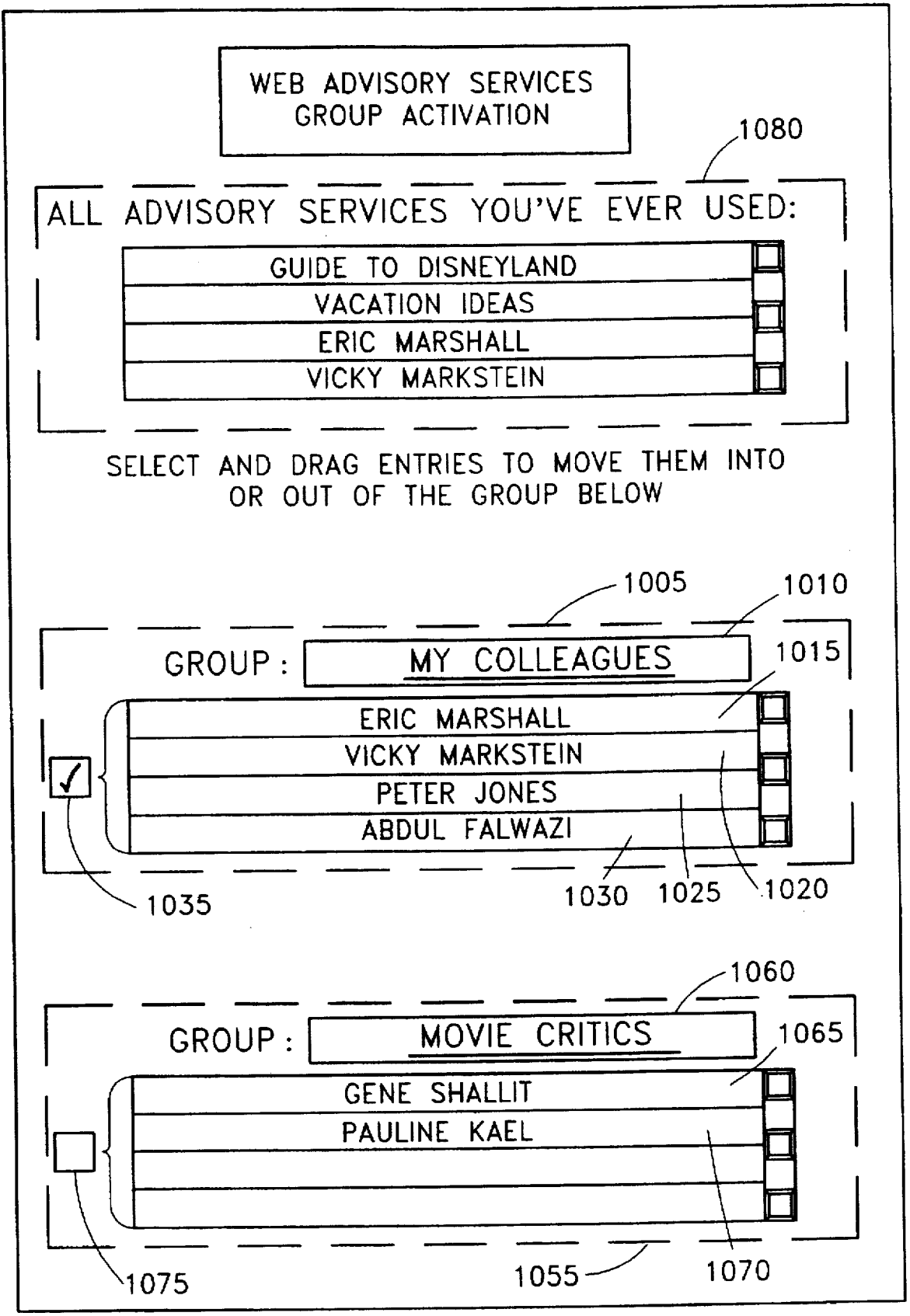
FIG. 10 illustrates a dialog box in accordance with the present invention wherein a user may construct groups of advisory services that can be activated and/or deactivated together.

FIG. 10 illustrates a dialog box in accordance with the present invention wherein a user may construct groups of advisory services that can be activated or deactivated together. Two groups are shown, group 1005 and group 1055. Each group has a group name 1010 and 1060, and each group consists of a list of advisory services. The services that are part of group 1005 are 1015, 1020, 1025, 1030. The services that are part of group 1055 are 1065, 1070. Checkboxes 1035 and 1075 may be used to activate or deactivate all services in a group. This figure shows one group activated (1035 is checked) and one deactivated (1075 is not checked). A list of all advisory services ever used 1080 is provided for the convenience of the user.

Figure 11:
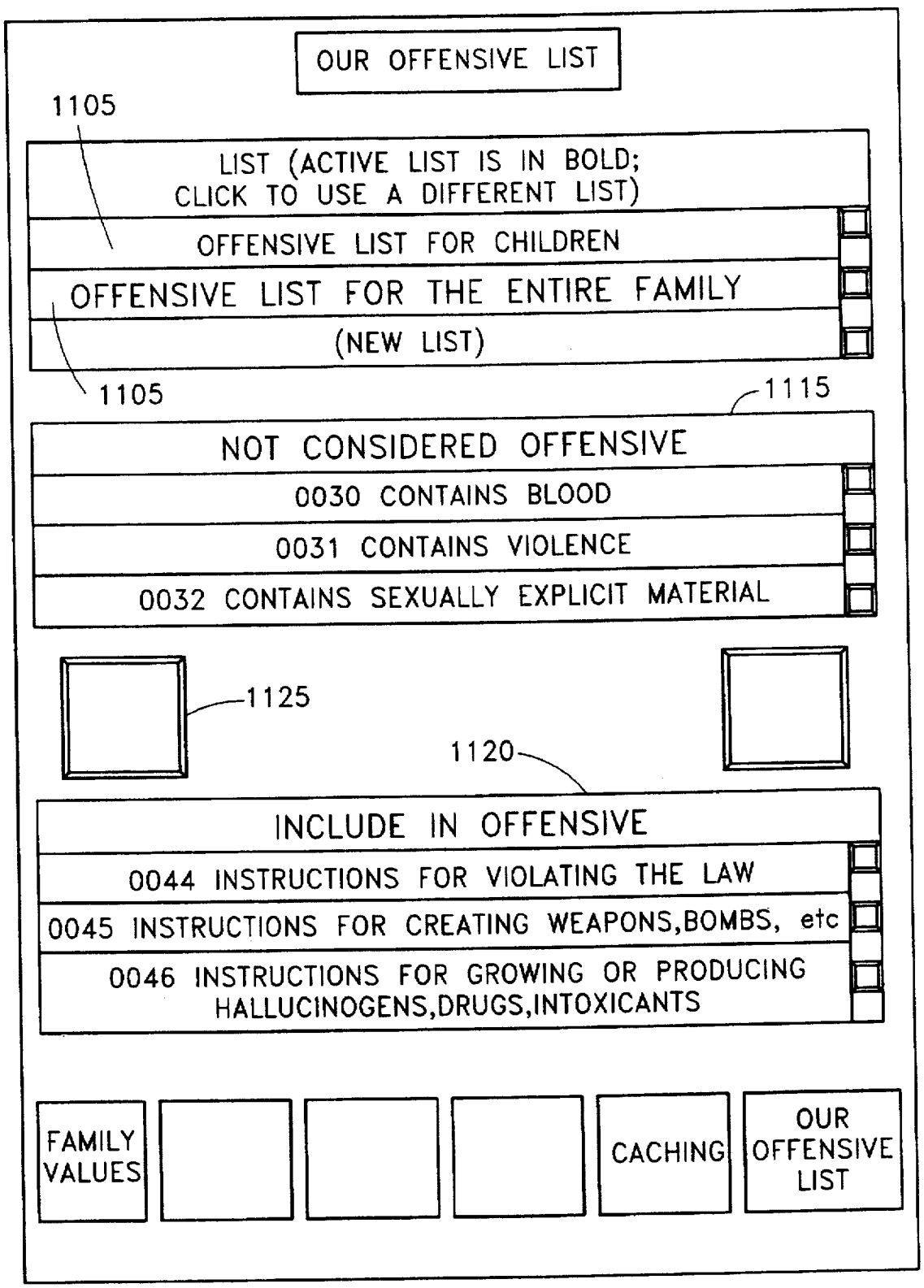
FIG. 11 illustrates a dialog box in accordance with the present invention wherein a user specifies precisely which ratings are to be considered acceptable and/or unacceptable.

FIG. 11 illustrates a dialog box in accordance with the present invention wherein a user can specify precisely which ratings are to be considered unacceptable. This is a sample dialog box page (tabs for other pages of the user setup dialog box are shown al the bottom). Multiple lists 1105 (two shown) may be created. The lists may be associated with particular users, or may be associated with the client system 25 as a whole. For a given active list (indicated in bold), the user divides the space of all ratings into a "not considered offensive" group 1115 and a "include in offensive" group 1120. Moving a rating from one to another is as simple as selecting it, and pressing the Shift Selected button 1125.

Figure 12A:
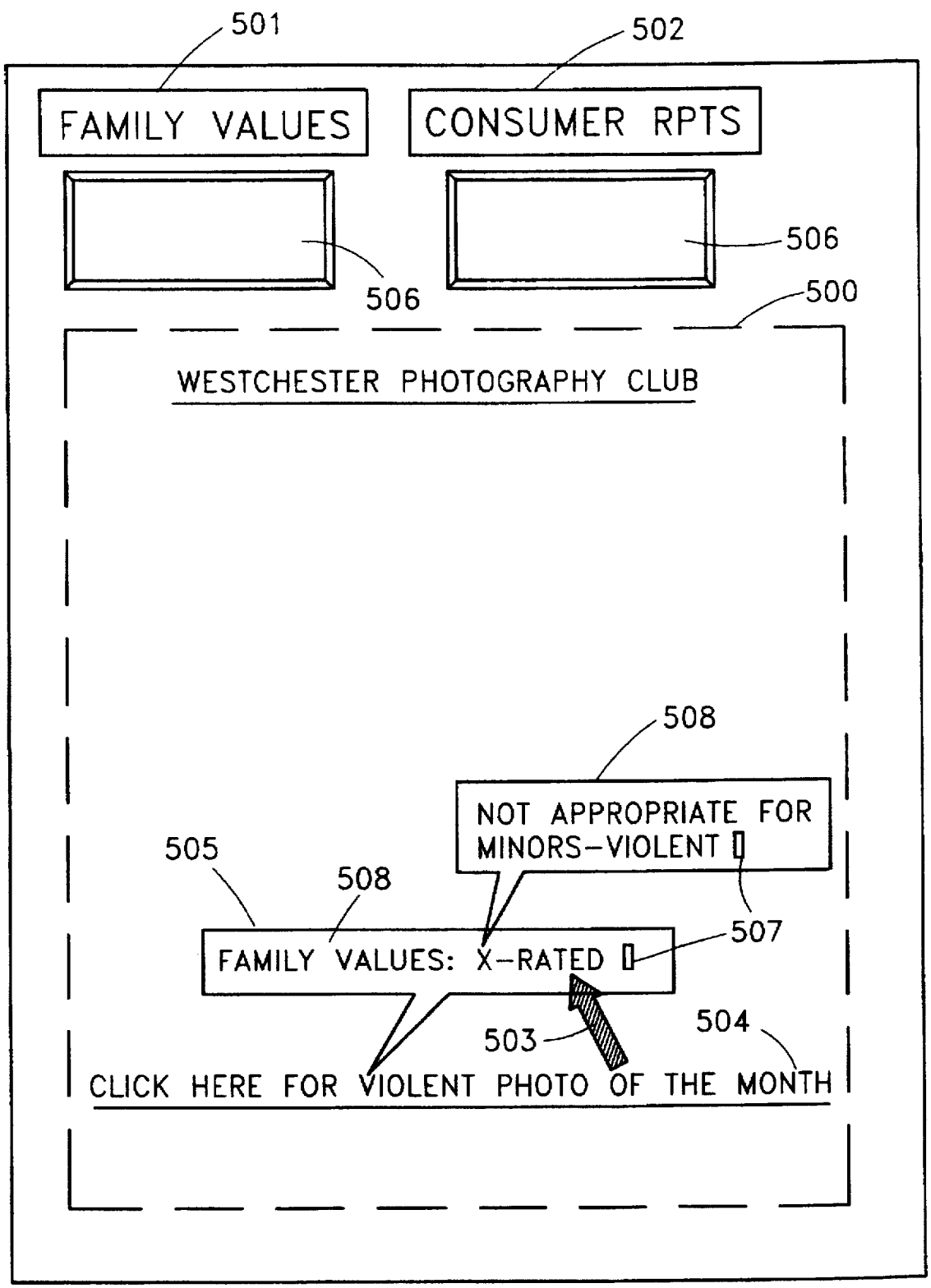
FIGS. 12(A)–(E) illustrate features of the present invention enabling users to be made aware of ratings in an efficient and user-friendly manner.
Figure 12B:
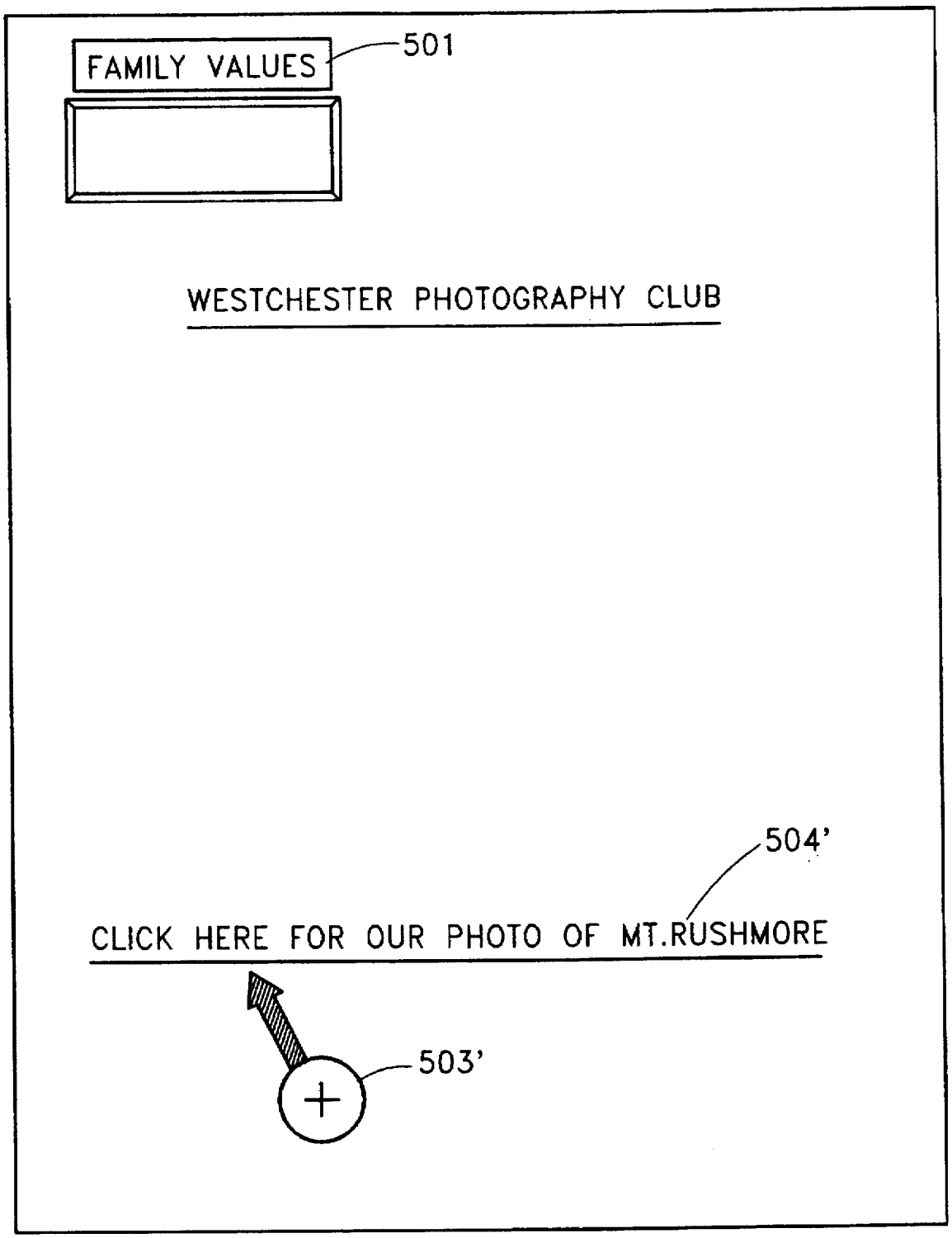
Figure 12C:
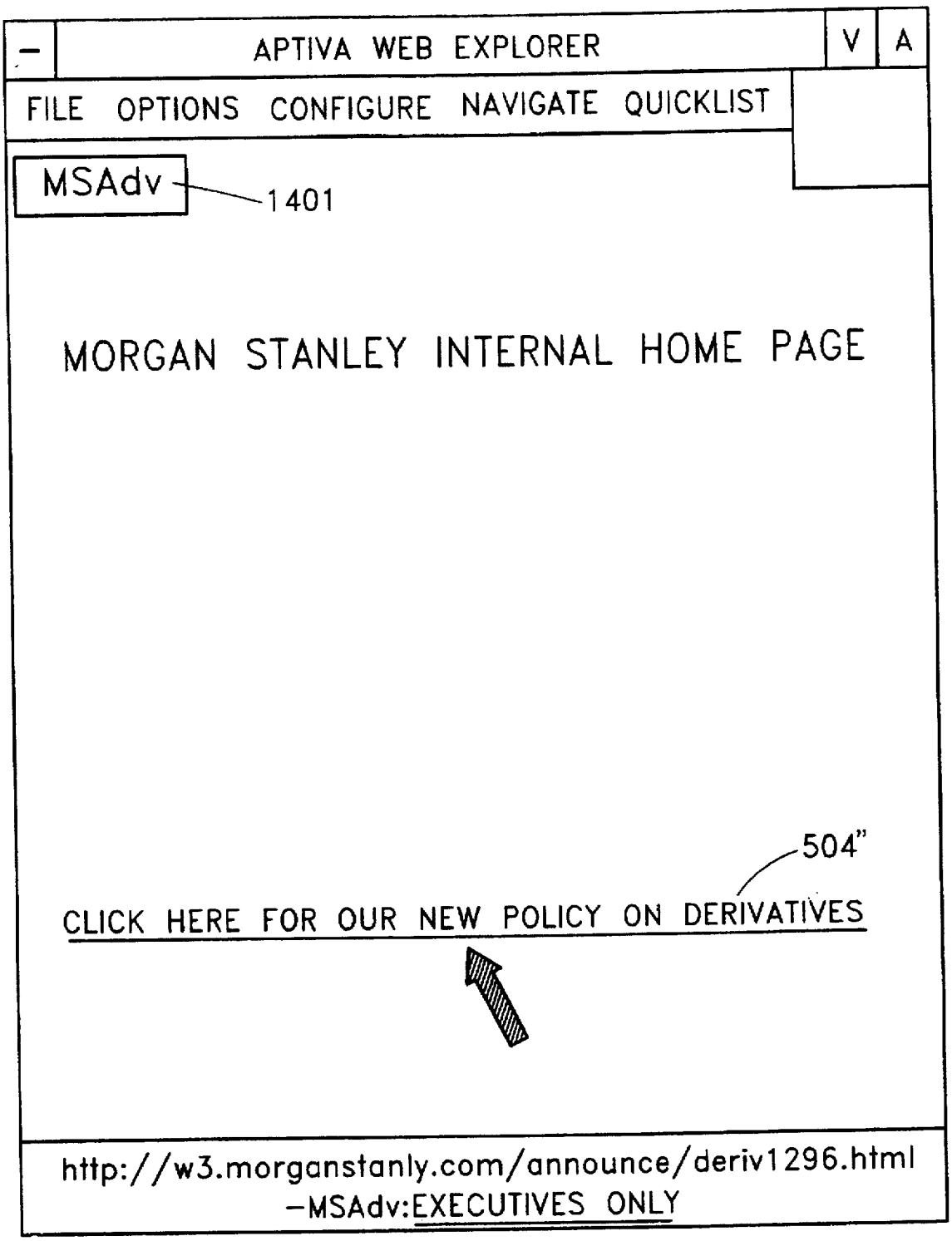
Figure 12D:
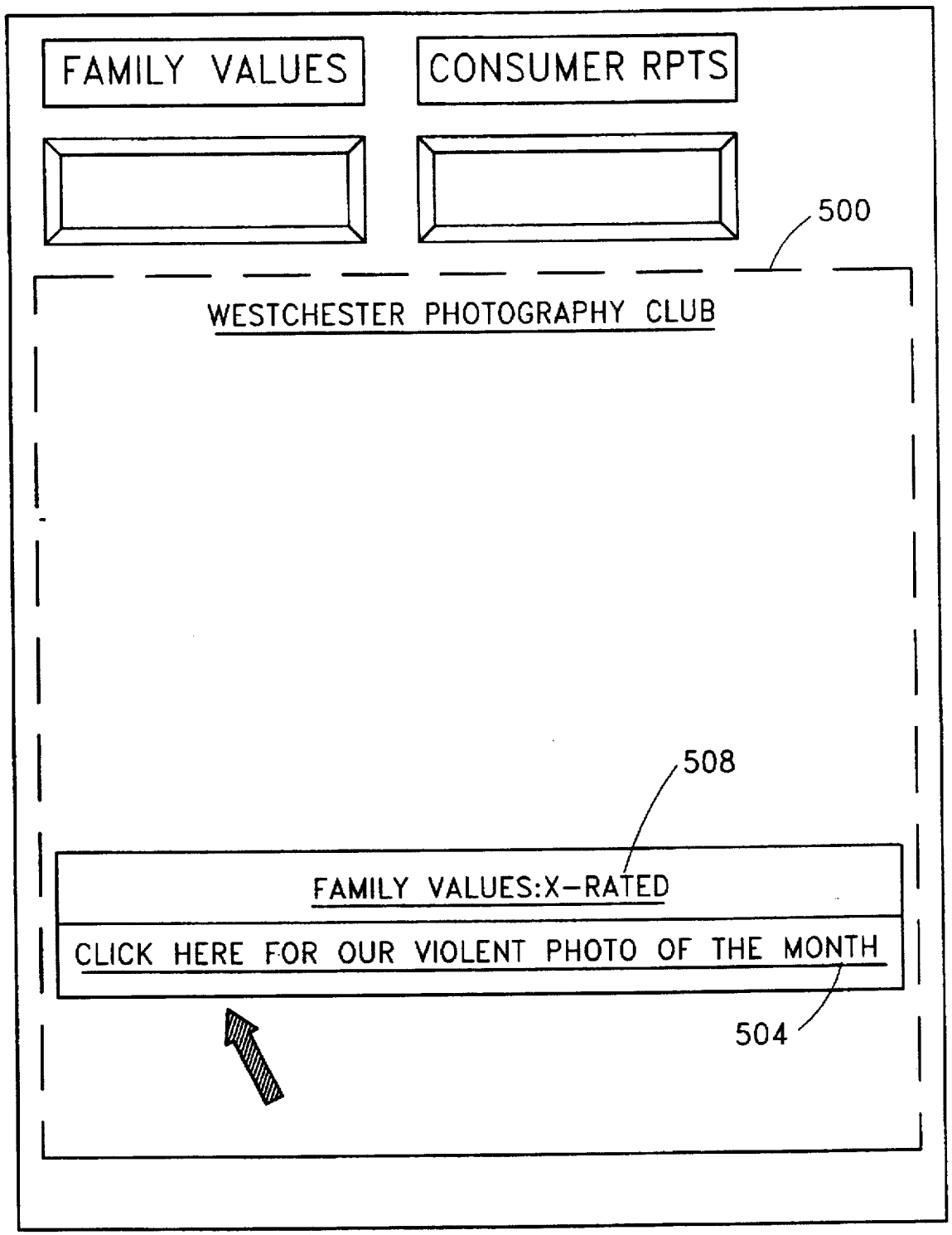
Figure 12E:
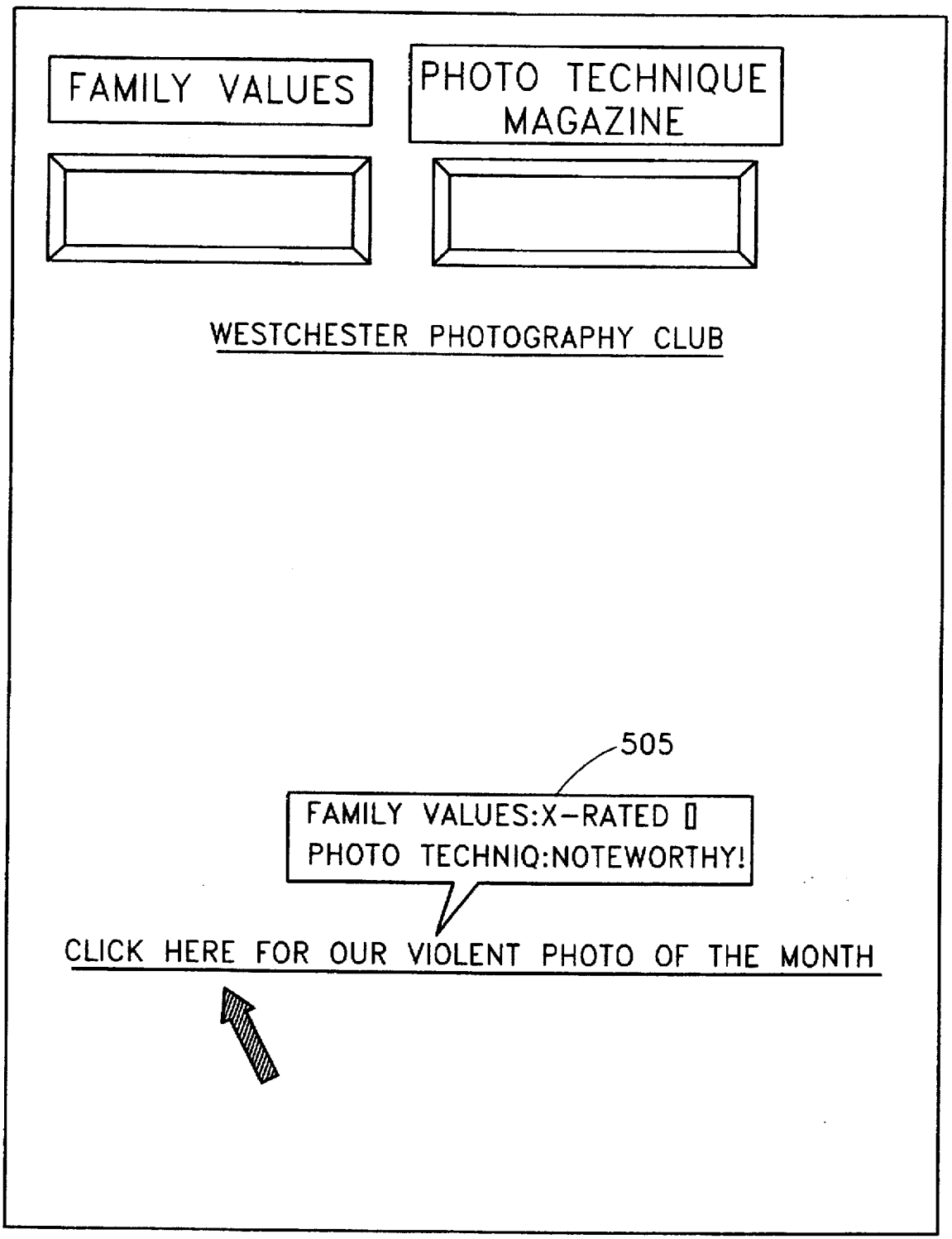

FIGS. 12(A)-(E) illustrate features of the present invention enabling users to be made aware of ratings in a way which is not distracting and which can synthesize ratings from many knowledge bases at the client, or at a server. Specifically, FIG. 12(A) shows an embodiment in accordance with the present invention of a Web browser screen for a user who has 2 Web Advisory services activated: Family Values 501 and Consumer Rpts. 502. The names of the active services appear above labelled buttons 506, which in this figure are blank, because the content being viewed. Westchester Photography Club home page 500, was not rated or was rated as acceptable. Family Values 501 returned an Advisory for the link anchor 504 shown as "Click here for our violent photo of the month". The short string 430 returned from the Advisory server was "X-Rated", the long string 440 returned was "Not appropriate for minors—violent", and an associated URL 450 was supplied. FIG. 12(A) also shows that a balloon 505 may be displayed when the mouse is moved to the anchor 504, and it includes the short string 430 If the user freezes the balloon 505 (e.g. by pressing the space bar), the user can use the mouse pointer to click on the small box 507 in the balloon 505 to load the associated URL 450, or can move the mouse 503 to the text 508 and see the long string 440 in a second balloon 508. FIG. 12(B) shows how the advisory for a link may be shown by changing the pointer icon. This is best for services that return general advisories (positive, neutral, negative). In this example, Family Values advisory server 501 returned response code 0008 (positive), when the mouse is pointing to the link 504', the pointer may change from a plain arrow 503 to a positive arrow 503'. FIG. 12(C) shows how the advisory returned for a link may be shown at the bottom of the screen when the mouse is over a link 504". The MSAdv (Morgan Stanley Advisory Service) is active, and has returned an advisory for the URL that would be loaded if "Click here for our new policy on derivatives" 504" was clicked. The short string 430 returned was "Executives Only" and an associated URL 450 was supplied. The advisory is itself a link to this associated URL, which is why it is underlined like a link. FIG. 12(D) shows how the advisory 508 may be added into the content of the page 500 in place. The name of the service and the short string appear in smaller print 508 just above the link anchor 504. FIG. 12(E) shows the contents of the balloon 1240 when more than one Advisory service returned an advisory for the same URL. This is best for services that return precise advisories.

In another aspect of the present invention, the advisory server 25 may check for an overuse attack by a client 25. An overuse attack occurs when a particular client has exceeded a predetermined number of requests within a given period of time, potentiahy degrading response times from the advisory server to queries from other clients. More specifically, the time of day of each user request is placed in the overuse detection table 1301 as shown in FIG. 13(A). Each entry of the overuse detection table 1301 includes the time of day of the last N requests from a user, and the users identification tag. The table 1301 is periodically purged of user entries where no request has been received in a predetermined number of minutes.

Generally, to detect an overuse attack, the advisory server 20 tracks the number of requests from each user over time. Users who have more than a predetermined number of requests for a given period of time will be presumed to be overusing the service. These users ids and the time of blocking will be placed in a Blocking Table 1303 as shown in FIG. 13(B), and their next request will receive a return code indicating they are blocked.

For example, the overuse detection table 1301 of FIG. 13(A) shows shows that user jones has been sending queries every one hundredth of a second. User 'butrico' has only sent one query. In addition, the blocking table 1303 of FIG. 13(B) indicates that user 'prager' had overuse detected at 12:01, and has not yet sent another request (the date/time told field is blank). When the next request is received, an 'overuse attack detected' return code will be sent and the date and time recorded in the date/time told field. User 'ravin' was detected as overusing at 11:22:31 and received a single response to their request of 11:22:32 indicating that their requests would now be ignored.

FIG. 14 illustrates the operation of the advisory server in utilizing the overuse detection table 1301 and blocking table 1303 of FIGS. 13(A) and (B) to detect an overuse attack. Only servers that require IDs with requests may use this approach to detecting overuse attacks. For when each advisory request signal received in step 1401, the advisory server 20 in step 1403 checks whether the user's ID is included in the advisory request signal. If there is not a user ID in the signal, in step 1403 operation continues to step 1405 wherein the request is ignored and the socket is closed. Otherwise, operation continues to steps 1407 and 1408 to check if an entry corresponding to the user ID is in the blocking table 1303. If so, operation continues to step 1409 to check if the user has previously been notified that his/her id is blocked. If so, operation continues to step 1405 as described above. If, in step 1409 it is determined that the user has not been previously notified that his/her id has been blocked, in step 1411 the current time is stored in the date/time told field of the entry corresponding to the user in the blocking table 1303, and in step 1413, the advisory server 20 notifies the user that an overuse attack has been detected.

If in step 1408 it is determined that the user ID is not in the blocking table 1303, operation continues to step 1417. In step 1417, the advisory server 20 checks whether an entry corresponding to the user is stored in the overuse detection table 1301. If not, in step 1419, a new entry that includes the user's ID and current time is added to the overuse detection table 1301. Otherwise, the current time as added to the corresponding entry in step 1421. In step 1423, the advisory server processes the updated entry to detect an overuse attack. More specifically, the advisory server 20 checks whether the number of requests stored in the entry exceeds a given threshold. If so, the particular user and current time is added as an entry to the blocking table 1303, to thereby block the next request received from the paticular user.

In addition to detecting overuse, the advisory server 20 may check for overloading. In this case, the advisory server checks whether the processing time to service a particular access exceeds a given threshold. If so, an overload has occurred. In response to the overload condition, users may be notified and requests ignored until the overloading condition ceases.

As described above, the invention is embodied in a client running a Web Browser adapted to communicate with one or more advisory servers. According to a second embodiment of the present invention, certain inventive aspects of the client running a Web Browser may be embodied in a proxy server. According to the second embodiment, the proxy server, when set in an advisory mode, for each content request to the content servers 6, requests characterization data from one or more of the advisory servers 20. The advisory servers 20 generate the appropriate characterization data based upon the information stored in the knowledge base 22, and transmit the characterization data to the proxy server. Upon receiving the characterization data, the proxy server utilizes the characterization data to determine whether to filter the content data transmitted by the content server 6. The details of the operation of the proxy server in filtering the content data are apparent from the description above with respect to FIGS. 2–14.

Other embodiments of the invention will be apparent to those skithed in the art from consideration of the specification and practice of the invention disclosed herein. It is intended that the specification and examples be considered as examples only, with the true scope of the invention being indicated by the claims.

I claim:

1. In a distributed data communication system wherein communication between a content requestor and a first content server occurs over a first communication link, wherein said content requestor under control of user input communicates a data request signal to said first content server over said first communication link, and wherein said first content server, upon receiving said data request signal, communicates content data to said content requestor according to said data request signal, a method of filtering said content data comprising the steps of:

setting said content requestor in an advisory mode wherein said content requestor communicates portions of said data request signal to a first advisory server over a seond communication link, and wherein said first advisory server is remote from said first content server;

controlling said first advisory server upon receipt of said portions of said request signal to retrieve characterization data from a data base coupled to said first advisory server and to communicate said characterization data to said content requestor over said second communication link; and inhibiting loading of at least a portion of said content data according to said characterization data.

2. The method of claim 1, further comprising the step of:
   attaching a pointer identifying addtional content data to said characterization data; and controlling said content requestor to retrieve said additional content data identified by said pointer.

3. The method of claim 2, wherein said additional content is stored in said data base coupled to said first advisory server.

4. The method of claim 2, wherein said additional content data is stored in a database coupled to said first content server.

5. The method of claim 2, wherein said additional content data is stored in a database coupled to a second content server, wherein said content requestor communicates with second server over a third communication link.

6. The method of claim 1, wherein daid content data includes a plurality of multimedia objects, further comprising the step of:
   inhibiting loading of a portion of said multimedia objects of said content data according to said characterization data.

7. The method of claim 1, wherein said characterization data comprises a return code, a short string field, and a long string field,
   wherein said said step of inhibiting loading of a portion of said content data is carried out according to said return code, and wherein said content requestor displays portions of at least one of said short string field and said long string field.

8. The method of claim 1, further comprising the step of:
   storing user profile data in a memory associated with said content requestor, wherein said step of inhibiting loading of at least a portion of said content data is carried out according to said characterization data and said user profile data.

9. The method of claim 8, wherein said content data includes a pointer to additional content data, and wherein said step of inhibiting loading of at least a portion of said additional content data is carried out according to said characterization data and said user profile data.

10. The method of claim 8, wherein said content requestor generates information related to said characterization data and said user profile data.

11. The method of claim 10, wherein said information related to said content data includes a portion of said characterization data.

12. The method of claim 10, wherein said information related to said content data includes a portion of said user profile data.

13. The method of claim 10, wherein said content requestor displays said information related to said content data.

14. The method of claim 8, wherein said information related to said content data includes a pointer for identifying additional content data, said method further comprising the step of:

controlling said content requestor to retrieve said additional content data identified by said pointer.

15. The method of claim 14, wherein said additional content data is stored in said data base coupled to said first advisory server.

16. The method of claim 14, wherein said additional content data is stored in a data base coupled to said first content server.

17. The method of claim 14, wherein said additional content data is stored in a database coupled to a second content server, wherein said content requestor communicates with said second content server over a third communications link.

18. The method of claim 1, wherein said characterization data characterizes said content data according to a predetermined standard.

19. The method of claim 18, wherein said predetermined standard indicates whether said content data is suitable for review by minors.

20. The method of claim 1, wherein said characterization data characterizes said first content server.

21. The method of claim 20, wherein said characterization data indicates whether a monetary charge is incurred by users who access said first content server.

22. The method of claim 1, further comprising the steps of:

controlling said content requestor to generate a billing status request signal related to said first advisory server;

communicating said billing status request signal to a second advisory server over a third communication link; and controlling, upon receipt of said billing status request signal, said second advisory server to retrieve billing status data from a data base coupled to said second advisory server, wherein said billing status data indicates whether a monetary charge is incurred by users who access said first advisory server, and to communicate said billing status data to said content requestor over said third communication link.

23. The method of claim 22, wherein said content requestor disables said advisory mode according to said billing status data.

24. The method of claim 22, wherein said content requestor displays a billing status associated with said first advisory server according to said billing status data.

25. The method of claim 22, wherein said first and second advisory servers are identical servers, and wherein said second and third communication links are identical communication links.

26. The method of claim 22, wherein said first and second advisory servers are remote from one another.

27. The method of claim 1, wherein said content requestor inhibits loading of said content data communicated from said content server at least until said characterization data is received from said first advisory server.

28. The method of claim 1, further comprising the steps of:

controlling said first advisory server to monitor a number of data request signals received from said content requestor to detect an overuse condition; and upon detecting said overuse condition, controlling said first advisory server to inhibit generation of said content data and communication of said content data to said content requestor, and controlling said first advisory server to communicate a message to said content requestor indicating said overuse condition.

29. The method of claim 1, wherein said content requestor includes a client coupled to a proxy server, wherein said proxy server interfaces to said first content server over said first communication link and to said first advisory server over said second communication link.

30. A system for censoring downloaded data from a content server to a client, comprising:

a remote advisory server connected to a content server and to a client through a distributed network; and a database associated with said advisory server for storing a plurality of characterization data, wherein said remote advisory server, upon receipt of a request signal from the client, rates a downloaded data from the content server with an appropriate characterization data from said database and forwards said characterization data to said client, said client censoring said downloaded data based on said characterization data.

31. A system for censoring downloaded data from a content server to a client as recited in claim 30, wherein said characterization data in said database is generated by an independent third party.

32. A system for censoring downloaded data from a content server to a client as recited in claim 31 wherein said characterization data characterizes data according to appropriateness for minors.

33. A system for censoring downloaded data from a content server to a client as recited in claim 30 wherein said client, prior to displaying the downloaded data, waits for said characterization data from said advisory server.

34. A system for censoring downloaded data from a content server to a client as recited in claim 30 wherein said distributed network comprises the Internet.

35. A system for censoring downloaded data from a content server to a client as recited in claim 34 wherein said downloaded data comprises a web page.

36. A system for censoring downloaded data from a content server to a client as recited in claim 35 wherein said advisory server rates said web page and rates all links on said web page.

* * * * *